US009107337B2

(12) United States Patent
Bassett

(10) Patent No.: US 9,107,337 B2
(45) Date of Patent: Aug. 18, 2015

(54) AGRICULTURAL APPARATUS FOR SENSING AND PROVIDING FEEDBACK OF SOIL PROPERTY CHANGES IN REAL TIME

(71) Applicant: Dawn Equipment Company, Sycamore, IL (US)

(72) Inventor: Joseph D. Bassett, Sycamore, IL (US)

(73) Assignee: Dawn Equipment Company, Sycamore, IL (US)

( * ) Notice: Subject to any disclaimer, the term of this patent is extended or adjusted under 35 U.S.C. 154(b) by 165 days.

(21) Appl. No.: 13/861,137

(22) Filed: Apr. 11, 2013

(65) Prior Publication Data

US 2014/0048296 A1  Feb. 20, 2014

Related U.S. Application Data

(63) Continuation-in-part of application No. 13/839,669, filed on Mar. 15, 2013, now abandoned, which is a continuation-in-part of application No. 13/589,829, filed on Aug. 20, 2012, now Pat. No. 8,985,232.

(51) Int. Cl.
*A01B 71/02* (2006.01)
*A01C 7/20* (2006.01)

(52) U.S. Cl.
CPC ............ *A01B 71/02* (2013.01); *A01C 7/203* (2013.01); *A01C 7/205* (2013.01)

(58) Field of Classification Search
CPC .... A01B 63/114; A01B 63/111; A01B 63/10; A01B 63/02; A01B 63/00; A01B 63/32; A01B 63/24; A01B 63/22; A01B 63/16; A01B 63/008; A01B 61/046; A01B 61/044; A01B 61/04; A01B 61/00; A01B 33/087; A01B 33/08; A01B 33/00; A01B 33/024; A01B 79/005; A01B 79/02; A01B 71/02; A01B 71/00; A01C 7/203; A01C 7/205; A01C 7/201; A01C 7/20; A01C 7/208; A01C 7/00; E02F 9/2029; E02F 9/2033; E02F 9/2037; E02F 9/2025; E02F 9/20; E02F 9/00; E02F 9/2271; E02F 9/2264; E02F 9/2257; E02F 9/2221; E02F 9/2217; E02F 9/2207; E02F 9/2203; E02F 9/22; E02F 5/027; E02F 5/02; E02F 5/00
USPC .................. 172/4, 2, 413; 701/50; 111/135, 111/139–143, 157, 163–169, 190–196, 200, 111/900, 927
See application file for complete search history.

(56) References Cited

U.S. PATENT DOCUMENTS 114,002 A    4/1871   Godfrey
353,491 A    2/1886   Wells
(Continued)

FOREIGN PATENT DOCUMENTS

BE    551372    10/1956
CA    530673    9/1956
(Continued)

OTHER PUBLICATIONS

Case Corporation Brochure, Planters 900 Series Units/Modules Product Information, Aug. 1986 (4 pages).
(Continued)

*Primary Examiner* — Christopher J Novosad
(74) *Attorney, Agent, or Firm* — Nixon Peabody LLP

(57) ABSTRACT

A planting row unit is attachable to a towing frame and is movable in a forward direction on a field having soil of varying hardness conditions. The planting row unit includes an opener device forward of the towing frame for preparing the soil for receiving at least one of the fertilizer and the seeds. The opener device includes a soil-hardness sensor for detecting changes in soil-hardness conditions and an opener blade for maintaining, in response to the changes, a constant soil-penetration depth Z in the soil independent of the varying hardness conditions. A modular actuator is mounted to the opener device for applying pressure to the opener blade, the modular actuator being mountable to at least one other component of the planting row unit for applying pressure.

20 Claims, 14 Drawing Sheets

(56) References Cited

U.S. PATENT DOCUMENTS

| | | | |
|---|---|---|---|
| 523,508 A | 7/1894 | Bauer et al. | |
| 736,369 A | 8/1903 | Dynes et al. | |
| 803,088 A | 10/1905 | Barker | |
| 1,134,462 A | 4/1915 | Kendrick | |
| 1,158,023 A | 10/1915 | Beaver | |
| 1,247,744 A | 11/1917 | Trimble | |
| 1,260,752 A | 3/1918 | Casaday | |
| 1,321,040 A | 11/1919 | Hoffman | |
| 1,391,593 A | 9/1921 | Sweeting | |
| 1,398,668 A | 11/1921 | Bordsen | |
| 1,791,462 A | 2/1931 | Bermel | |
| 1,901,299 A | 3/1933 | Johnson | |
| 1,901,778 A | 3/1933 | Schlag | |
| 2,014,334 A | 9/1935 | Johnson | |
| 2,058,539 A | 10/1936 | Welty et al. | |
| 2,269,051 A | 1/1942 | Cahoy | |
| 2,298,539 A * | 10/1942 | Mott et al. | 172/265 |
| 2,341,143 A | 2/1944 | Herr | |
| 2,505,276 A | 4/1950 | Boroski | |
| 2,561,763 A | 7/1951 | Waters et al. | |
| 2,593,176 A | 4/1952 | Patterson | |
| 2,611,306 A | 9/1952 | Strehlow et al. | |
| 2,612,827 A | 10/1952 | Baggette et al. | |
| 2,691,353 A | 10/1954 | Secondo | |
| 2,692,544 A | 10/1954 | Jessup | |
| 2,715,286 A | 8/1955 | Saveson | |
| 2,754,622 A | 7/1956 | Rohnert | |
| 2,771,044 A | 11/1956 | Putifer | |
| 2,773,343 A | 12/1956 | Oppel | |
| 2,777,373 A | 1/1957 | Pursche | |
| 2,799,234 A | 7/1957 | Chancey | |
| 2,805,574 A | 9/1957 | Jackson, Jr. et al. | |
| 2,925,872 A | 2/1960 | Darnell | |
| 2,960,358 A | 11/1960 | Christison | |
| 3,010,744 A | 11/1961 | Hollis | |
| 3,014,547 A | 12/1961 | Van der Lely | |
| 3,038,424 A | 6/1962 | Johnson | |
| 3,042,121 A | 7/1962 | Broetzman et al. | |
| 3,057,092 A | 10/1962 | Curlett | |
| 3,058,243 A | 10/1962 | McGee | |
| 3,065,879 A | 11/1962 | Jennings et al. | |
| 3,110,973 A | 11/1963 | Reynolds | |
| 3,122,901 A | 3/1964 | Thompson | |
| 3,123,152 A | 3/1964 | Biskis | |
| 3,188,989 A | 6/1965 | Johnston | |
| 3,213,514 A | 10/1965 | Evans | |
| 3,250,109 A | 5/1966 | Spyridakis | |
| 3,314,278 A | 4/1967 | Bergman | |
| 3,319,589 A | 5/1967 | Moran | |
| 3,351,139 A | 11/1967 | Schmitz et al. | |
| 3,355,930 A | 12/1967 | Fedorov | |
| 3,370,450 A | 2/1968 | Scheucher | |
| 3,420,273 A | 1/1969 | Greer | |
| 3,447,495 A | 6/1969 | Miller et al. | |
| 3,539,020 A | 11/1970 | Andersson et al. | 74/527 |
| 3,543,603 A | 12/1970 | Gley | 74/529 |
| 3,561,541 A | 2/1971 | Woelfel | 172/265 |
| 3,576,098 A | 4/1971 | Brewer | 56/295 |
| 3,581,685 A | 6/1971 | Taylor | 111/7 |
| 3,593,720 A | 7/1971 | Botterill et al. | 130/27 |
| 3,606,745 A | 9/1971 | Girodat | 56/20 |
| 3,635,495 A | 1/1972 | Orendorff | 280/415 |
| 3,653,446 A | 4/1972 | Kalmon | 172/4 |
| 3,701,327 A | 10/1972 | Krumholz | 111/81 |
| 3,708,019 A | 1/1973 | Ryan | 172/470 |
| 3,718,191 A | 2/1973 | Williams | 172/196 |
| 3,749,035 A | 7/1973 | Cayton et al. | 111/85 |
| 3,753,341 A | 8/1973 | Berg, Jr. et al. | 56/400.04 |
| 3,766,988 A | 10/1973 | Whitesides | 172/548 |
| 3,774,446 A | 11/1973 | Diehl | 73/194 |
| 3,939,846 A | 2/1976 | Drozhzhin et al. | 130/27 |
| 3,945,532 A | 3/1976 | Marks | 222/55 |
| 3,975,890 A | 8/1976 | Rodger | 56/208 |
| 4,009,668 A | 3/1977 | Brass et al. | 111/85 |
| 4,018,101 A | 4/1977 | Mihalic | 74/493 |
| 4,044,697 A | 8/1977 | Swanson | 111/66 |
| 4,055,126 A | 10/1977 | Brown et al. | 111/85 |
| 4,058,171 A | 11/1977 | van der Lely | 172/713 |
| 4,063,597 A | 12/1977 | Day | 172/126 |
| 4,096,730 A | 6/1978 | Martin | 72/352 |
| 4,099,576 A | 7/1978 | Jilani | 172/555 |
| 4,122,715 A | 10/1978 | Yokoyama et al. | 73/228 |
| 4,129,082 A | 12/1978 | Betulius | 111/7 |
| 4,141,200 A | 2/1979 | Johnson | 56/10.2 |
| 4,141,302 A | 2/1979 | Morrison, Jr. et al. | 111/52 |
| 4,141,676 A | 2/1979 | Jannen et al. | 417/539 |
| 4,142,589 A | 3/1979 | Schlagenhauf | 172/510 |
| 4,147,305 A | 4/1979 | Hunt | 239/167 |
| 4,149,475 A | 4/1979 | Bailey et al. | 111/66 |
| 4,157,661 A | 6/1979 | Schindel | 73/228 |
| 4,173,259 A | 11/1979 | Heckenkamp | 172/10 |
| 4,182,099 A | 1/1980 | Davis et al. | 56/16.4 |
| 4,187,916 A | 2/1980 | Harden et al. | 172/146 |
| 4,191,262 A | 3/1980 | Sylvester | 172/459 |
| 4,196,567 A | 4/1980 | Davis et al. | 56/13.7 |
| 4,196,917 A | 4/1980 | Oakes et al. | 280/463 |
| 4,206,817 A | 6/1980 | Bowerman | 172/559 |
| 4,208,974 A | 6/1980 | Dreyer et al. | 111/85 |
| 4,213,408 A | 7/1980 | West et al. | 111/85 |
| 4,225,191 A | 9/1980 | Knoski | 301/9 |
| 4,233,803 A | 11/1980 | Davis et al. | 56/14.9 |
| 4,241,674 A | 12/1980 | Mellinger | 111/52 |
| 4,280,419 A | 7/1981 | Fischer | 111/80 |
| 4,295,532 A | 10/1981 | Williams et al. | 172/184 |
| 4,301,870 A | 11/1981 | Carre et al. | 172/7 |
| 4,307,674 A | 12/1981 | Jennings et al. | 111/85 |
| 4,311,104 A | 1/1982 | Steilen et al. | 111/85 |
| 4,317,355 A | 3/1982 | Hatsuno et al. | 72/342 |
| 4,359,101 A | 11/1982 | Gagnon | 172/38 |
| 4,375,837 A | 3/1983 | van der Lely et al. | 172/68 |
| 4,377,979 A | 3/1983 | Peterson et al. | 111/52 |
| 4,407,371 A | 10/1983 | Hohl | 172/253 |
| 4,413,685 A * | 11/1983 | Gremelspacher et al. | 172/316 |
| 4,430,952 A | 2/1984 | Murray | 111/85 |
| 4,433,568 A | 2/1984 | Kondo | 72/356 |
| 4,438,710 A | 3/1984 | Paladino | 111/3 |
| 4,445,445 A | 5/1984 | Sterrett | 111/7 |
| 4,461,355 A | 7/1984 | Peterson et al. | 172/156 |
| 4,481,830 A | 11/1984 | Smith et al. | 73/861.71 |
| 4,499,775 A | 2/1985 | Lasoen | 73/862.57 |
| 4,506,610 A | 3/1985 | Neal | 111/87 |
| 4,508,178 A | 4/1985 | Cowell et al. | 172/239 |
| 4,528,920 A | 7/1985 | Neumeyer | 111/85 |
| 4,530,405 A | 7/1985 | White | 172/126 |
| 4,537,262 A | 8/1985 | van der Lely | 172/146 |
| 4,538,688 A | 9/1985 | Szucs et al. | 172/555 |
| 4,550,122 A | 10/1985 | David et al. | 172/158 |
| 4,553,607 A | 11/1985 | Behn et al. | 172/156 |
| 4,580,506 A | 4/1986 | Fleischer et al. | 111/7 |
| 4,596,200 A | 6/1986 | Gafford et al. | 111/85 |
| 4,603,746 A | 8/1986 | Swales | 172/559 |
| 4,604,906 A | 8/1986 | Scarpa | 73/861.74 |
| 4,630,773 A | 12/1986 | Ortlip | 239/1 |
| 4,643,043 A | 2/1987 | Furuta et al. | 74/503 |
| 4,646,620 A | 3/1987 | Buchl | 91/1 |
| 4,650,005 A | 3/1987 | Tebben | 172/430 |
| 4,669,550 A | 6/1987 | Sittre | 172/559 |
| 4,671,193 A | 6/1987 | States | 111/73 |
| 4,674,578 A | 6/1987 | Bexten et al. | 172/126 |
| 4,703,809 A | 11/1987 | Van den Ende | 172/147 |
| 4,726,304 A | 2/1988 | Dreyer et al. | 111/73 |
| 4,738,461 A | 4/1988 | Stephenson et al. | 280/400 |
| 4,744,316 A | 5/1988 | Lienemann et al. | 111/69 |
| 4,762,075 A | 8/1988 | Halford | 111/73 |
| 4,765,190 A | 8/1988 | Strubbe | 73/861.72 |
| 4,768,387 A | 9/1988 | Kemp et al. | 73/861.73 |
| 4,779,684 A | 10/1988 | Schultz | 171/62 |
| 4,785,890 A | 11/1988 | Martin | 172/29 |
| 4,825,957 A | 5/1989 | White et al. | 172/126 |
| 4,825,959 A | 5/1989 | Wilhelm | 172/720 |
| 4,920,901 A | 5/1990 | Pounds | 111/164 |
| 4,926,767 A | 5/1990 | Thomas | 111/187 |
| 4,930,431 A | 6/1990 | Alexander | 111/164 |
| 4,986,367 A | 1/1991 | Kinzenbaw | 172/126 |

(56) References Cited

U.S. PATENT DOCUMENTS

| | | | |
|---|---|---|---|
| 4,998,488 A | 3/1991 | Hansson | 111/187 |
| 5,015,997 A | 5/1991 | Strubbe | 340/684 |
| 5,027,525 A | 7/1991 | Haukaas | 33/624 |
| 5,033,397 A | 7/1991 | Colburn, Jr. | 111/118 |
| 5,065,632 A | 11/1991 | Reuter | 73/861.73 |
| 5,074,227 A | 12/1991 | Schwitters | 111/137 |
| 5,076,180 A | 12/1991 | Schneider | 111/139 |
| 5,092,255 A | 3/1992 | Long et al. | 111/167 |
| 5,113,957 A | 5/1992 | Tamai et al. | 172/10 |
| 5,129,282 A | 7/1992 | Bassett et al. | 74/529 |
| 5,136,934 A | 8/1992 | Darby, Jr. | 100/125 |
| 5,190,112 A | 3/1993 | Johnston et al. | 172/245 |
| 5,234,060 A | 8/1993 | Carter | 172/413 |
| 5,240,080 A | 8/1993 | Bassett et al. | 172/740 |
| 5,255,617 A | 10/1993 | Williams et al. | 111/140 |
| 5,269,237 A | 12/1993 | Baker et al. | 111/121 |
| 5,282,389 A | 2/1994 | Faivre et al. | 73/861.73 |
| 5,285,854 A | 2/1994 | Thacker et al. | 172/176 |
| 5,333,694 A | 8/1994 | Roggenbuck et al. | 172/156 |
| 5,337,832 A | 8/1994 | Bassett | 172/504 |
| 5,341,754 A | 8/1994 | Winterton | 111/139 |
| 5,346,019 A | 9/1994 | Kinzenbaw et al. | 172/311 |
| 5,346,020 A | 9/1994 | Bassett | 172/540 |
| 5,349,911 A | 9/1994 | Holst et al. | 111/139 |
| 5,351,635 A | 10/1994 | Hulicsko | 111/135 |
| 5,379,847 A | 1/1995 | Snyder | 172/128 |
| 5,394,946 A | 3/1995 | Clifton et al. | 172/139 |
| 5,398,771 A | 3/1995 | Hornung et al. | 172/311 |
| 5,419,402 A | 5/1995 | Heintzman | 172/551 |
| 5,427,192 A | 6/1995 | Stephenson et al. | 180/53.1 |
| 5,443,023 A | 8/1995 | Carroll | 111/191 |
| 5,443,125 A | 8/1995 | Clark et al. | 172/608 |
| 5,461,995 A | 10/1995 | Winterton | 111/139 |
| 5,462,124 A | 10/1995 | Rawson | 172/569 |
| 5,473,999 A | 12/1995 | Rawson et al. | 111/127 |
| 5,477,682 A | 12/1995 | Tobiasz | 60/583 |
| 5,477,792 A | 12/1995 | Bassett et al. | 111/121 |
| 5,479,868 A | 1/1996 | Bassett | 111/139 |
| 5,479,992 A | 1/1996 | Bassett | 172/4 |
| 5,485,796 A | 1/1996 | Bassett | 111/33 |
| 5,485,886 A | 1/1996 | Bassett | 172/763 |
| 5,497,717 A | 3/1996 | Martin | 111/191 |
| 5,497,837 A | 3/1996 | Kehrney | 172/619 |
| 5,499,683 A | 3/1996 | Bassett | 172/4 |
| 5,499,685 A | 3/1996 | Downing, Jr. | 172/699 |
| 5,517,932 A | 5/1996 | Ott et al. | 111/193 |
| 5,524,525 A | 6/1996 | Nikkel et al. | 91/179 |
| 5,531,171 A | 7/1996 | Whitesel et al. | 111/121 |
| 5,542,362 A | 8/1996 | Bassett | 111/120 |
| 5,544,709 A | 8/1996 | Lowe et al. | 172/661 |
| 5,562,165 A | 10/1996 | Janelle et al. | 172/4 |
| 5,590,611 A | 1/1997 | Smith | 111/127 |
| 5,603,269 A | 2/1997 | Bassett | 111/52 |
| 5,623,997 A | 4/1997 | Rawson et al. | 172/156 |
| 5,640,914 A | 6/1997 | Rawson | 111/140 |
| 5,657,707 A | 8/1997 | Dresher et al. | 111/139 |
| 5,660,126 A | 8/1997 | Freed et al. | 111/140 |
| 5,685,245 A | 11/1997 | Bassett | 111/62 |
| 5,704,430 A | 1/1998 | Smith et al. | 172/29 |
| 5,709,271 A | 1/1998 | Bassett | 172/4 |
| 5,727,638 A | 3/1998 | Wodrich et al. | 172/414 |
| 5,852,982 A | 12/1998 | Peter | 111/118 |
| 5,868,207 A | 2/1999 | Langbakk et al. | 172/274 |
| 5,878,678 A | 3/1999 | Stephens et al. | 111/139 |
| RE36,243 E | 7/1999 | Rawson et al. | 111/121 |
| 5,970,891 A | 10/1999 | Schlagel | 111/135 |
| 5,970,892 A | 10/1999 | Wendling et al. | 111/139 |
| 5,988,293 A | 11/1999 | Brueggen et al. | 172/414 |
| 6,067,918 A | 5/2000 | Kirby | 111/121 |
| 6,164,385 A | 12/2000 | Buchl | 172/239 |
| 6,223,663 B1 | 5/2001 | Wendling et al. | 111/139 |
| 6,223,828 B1 | 5/2001 | Paulson et al. | 171/63 |
| 6,237,696 B1 | 5/2001 | Mayerle | 172/558 |
| 6,253,692 B1 | 7/2001 | Wendling et al. | 111/139 |
| 6,314,897 B1 | 11/2001 | Hagny | 111/192 |
| 6,325,156 B1 | 12/2001 | Barry | 172/518 |
| 6,330,922 B1 | 12/2001 | King | 172/166 |
| 6,331,142 B1 | 12/2001 | Bischoff | 460/112 |
| 6,343,661 B1 | 2/2002 | Thompson et al. | 172/444 |
| 6,347,594 B1 | 2/2002 | Wendling et al. | 111/167 |
| 6,382,326 B1 | 5/2002 | Goins et al. | 172/239 |
| 6,389,999 B1 | 5/2002 | Duello | 111/200 |
| 6,453,832 B1 | 9/2002 | Schaffert | 111/150 |
| 6,454,019 B1 | 9/2002 | Prairie et al. | 172/677 |
| 6,460,623 B1 | 10/2002 | Knussman et al. | 172/4 |
| 6,516,595 B2 | 2/2003 | Rhody et al. | 56/10.2 E |
| 6,530,334 B2 | 3/2003 | Hagny | 111/189 |
| 6,575,104 B2 | 6/2003 | Brummelhuis | 111/139 |
| 6,644,224 B1 | 11/2003 | Bassett | 111/157 |
| 6,701,856 B1 | 3/2004 | Zoske et al. | 111/121 |
| 6,701,857 B1 | 3/2004 | Jensen et al. | 111/200 |
| 6,786,130 B2 | 9/2004 | Steinlage et al. | 91/390 |
| 6,834,598 B2 | 12/2004 | Jüptner | 111/140 |
| 6,840,853 B2 | 1/2005 | Foth | 460/111 |
| 6,886,650 B2 | 5/2005 | Bremmer | 180/89.13 |
| 6,912,963 B2 | 7/2005 | Bassett | 111/163 |
| 6,986,313 B2 | 1/2006 | Halford et al. | 111/186 |
| 6,997,400 B1 | 2/2006 | Hanna et al. | 239/383 |
| 7,004,090 B2 | 2/2006 | Swanson | 111/119 |
| 7,044,070 B2 | 5/2006 | Kaster et al. | 111/62 |
| 7,063,167 B1 | 6/2006 | Staszak et al. | 172/328 |
| 7,159,523 B2 | 1/2007 | Bourgault et al. | 111/187 |
| 7,222,575 B2 | 5/2007 | Bassett | 111/140 |
| 7,290,491 B2 | 11/2007 | Summach et al. | 111/181 |
| 7,360,494 B2 | 4/2008 | Martin | 111/164 |
| 7,360,495 B1 | 4/2008 | Martin | 111/164 |
| 7,438,006 B2 | 10/2008 | Mariman et al. | 111/164 |
| 7,451,712 B2 | 11/2008 | Bassett et al. | 111/140 |
| 7,523,709 B1 | 4/2009 | Kiest | 111/119 |
| 7,540,333 B2 | 6/2009 | Bettin et al. | 172/744 |
| 7,575,066 B2 | 8/2009 | Bauer | 172/540 |
| 7,584,707 B2 | 9/2009 | Sauder et al. | 111/140 |
| 7,665,539 B2 | 2/2010 | Bassett et al. | 172/540 |
| 7,673,570 B1 | 3/2010 | Bassett | 111/63 |
| 7,743,718 B2 | 6/2010 | Bassett | 111/135 |
| 7,870,827 B2 | 1/2011 | Bassett | 111/119 |
| 7,938,074 B2 | 5/2011 | Liu | 111/200 |
| 7,946,231 B2 | 5/2011 | Martin et al. | 111/60 |
| 8,146,519 B2 | 4/2012 | Bassett | 111/119 |
| 8,151,717 B2 | 4/2012 | Bassett | 111/135 |
| 8,327,780 B2 | 12/2012 | Bassett | 111/119 |
| 8,359,988 B2 | 1/2013 | Bassett | 111/135 |
| 8,380,356 B1 | 2/2013 | Zielke et al. | 700/284 |
| 8,386,137 B2 | 2/2013 | Sauder et al. | 701/50 |
| 8,393,407 B2 | 3/2013 | Freed | 172/551 |
| 8,408,149 B2 | 4/2013 | Rylander | 111/140 |
| 6,644,224 C1 | 6/2013 | Bassett | 111/157 |
| 6,912,963 C1 | 6/2013 | Bassett | 111/163 |
| 7,222,575 C1 | 6/2013 | Bassett | 111/140 |
| 8,544,397 B2 | 10/2013 | Bassett | 111/167 |
| 8,544,398 B2 | 10/2013 | Bassett | 111/167 |
| 8,550,020 B2 | 10/2013 | Sauder et al. | 111/200 |
| 8,573,319 B1 | 11/2013 | Casper et al. | 172/4 |
| 8,634,992 B2 | 1/2014 | Sauder et al. | 701/50 |
| 8,636,077 B2 | 1/2014 | Bassett | 172/195 |
| 2002/0162492 A1 | 11/2002 | Juptner | 111/140 |
| 2005/0199842 A1* | 9/2005 | Parsons et al. | 251/129.04 |
| 2006/0102058 A1 | 5/2006 | Swanson | 111/119 |
| 2006/0191695 A1 | 8/2006 | Walker et al. | 172/452 |
| 2006/0237203 A1 | 10/2006 | Miskin | 172/799.5 |
| 2007/0044694 A1 | 3/2007 | Martin | 111/121 |
| 2007/0272134 A1 | 11/2007 | Baker et al. | 111/163 |
| 2008/0093093 A1 | 4/2008 | Sheppard et al. | 172/2 |
| 2008/0236461 A1 | 10/2008 | Sauder et al. | 111/170 |
| 2008/0256916 A1 | 10/2008 | Vaske et al. | 56/13.5 |
| 2010/0019471 A1 | 1/2010 | Ruckle et al. | 280/504 |
| 2010/0108336 A1 | 5/2010 | Thomson et al. | 172/795 |
| 2010/0180695 A1 | 7/2010 | Sauder et al. | 73/862.045 |
| 2010/0198529 A1 | 8/2010 | Sauder et al. | 702/41 |
| 2010/0282480 A1 | 11/2010 | Breker et al. | 172/170 |
| 2011/0247537 A1 | 10/2011 | Freed | 111/140 |
| 2011/0313575 A1 | 12/2011 | Kowalchuk et al. | 700/282 |
| 2012/0167809 A1 | 7/2012 | Bassett | 111/119 |
| 2012/0186216 A1 | 7/2012 | Vaske et al. | 56/367 |

(56) References Cited

U.S. PATENT DOCUMENTS

| | | | |
|---|---|---|---|
| 2012/0210920 A1 | 8/2012 | Bassett | 111/140 |
| 2012/0216731 A1 | 8/2012 | Schilling et al. | 111/69 |
| 2012/0232691 A1 | 9/2012 | Green et al. | 700/231 |
| 2012/0255475 A1 | 10/2012 | Mariman et al. | 111/149 |
| 2012/0305274 A1 | 12/2012 | Bassett | 172/5 |
| 2013/0032363 A1 | 2/2013 | Curry et al. | 172/4 |
| 2013/0112121 A1 | 5/2013 | Achen et al. | 111/14 |
| 2013/0112124 A1 | 5/2013 | Bergen et al. | 111/151 |
| 2013/0133904 A1 | 5/2013 | Bassett | 172/239 |
| 2013/0146318 A1 | 6/2013 | Bassett | 172/5 |
| 2013/0192186 A1 | 8/2013 | Bassett | 56/10.2 E |
| 2013/0199808 A1 | 8/2013 | Bassett | 172/260.5 |
| 2013/0213676 A1 | 8/2013 | Bassett | 172/260.5 |
| 2013/0248212 A1 | 9/2013 | Bassett | 172/4 |
| 2013/0264078 A1 | 10/2013 | Bassett | 172/260.5 |
| 2013/0306337 A1 | 11/2013 | Bassett | 172/260.5 |
| 2013/0333599 A1 | 12/2013 | Bassett et al. | 111/62 |
| 2014/0026748 A1 | 1/2014 | Stoller et al. | 91/418 |
| 2014/0026792 A1 | 1/2014 | Bassett | 111/121 |
| 2014/0033958 A1 | 2/2014 | Bassett | 111/193 |
| 2014/0034339 A1 | 2/2014 | Sauder et al. | 172/2 |
| 2014/0034343 A1 | 2/2014 | Sauder et al. | 172/664 |
| 2014/0034344 A1 | 2/2014 | Bassett | 172/5 |
| 2014/0048001 A1 | 2/2014 | Bassett | 111/59 |
| 2014/0048295 A1 | 2/2014 | Bassett | 172/2 |
| 2014/0048296 A1 | 2/2014 | Bassett | 172/4 |
| 2014/0048297 A1 | 2/2014 | Bassett | 172/4 |

FOREIGN PATENT DOCUMENTS

| | | | | |
|---|---|---|---|---|
| DE | 335464 | | 9/1921 | |
| DE | 1108971 | | 6/1961 | |
| DE | 24 02 411 | | 7/1975 | |
| EP | 2 497 348 | A1 | 9/2012 | A01B 79/00 |
| GB | 1 574 412 | | 9/1980 | 111/123 |
| GB | 2 056 238 | A | 10/1982 | |
| JP | 54-57726 | | 5/1979 | 74/529 |
| SU | 392897 | | 8/1973 | |
| SU | 436778 | | 7/1974 | |
| SU | 611201 | | 6/1978 | 74/527 |
| SU | 625648 | | 9/1978 | |
| SU | 1410884 | A1 | 7/1988 | |
| SU | 1466674 | | 3/1989 | 111/124 |
| WO | WO 2011/161140 | A1 | 12/2011 | A01C 7/20 |
| WO | WO 2012/149367 | A1 | 1/2012 | A01C 5/00 |
| WO | WO 2012/149415 | A1 | 1/2012 | A01B 63/111 |
| WO | WO 2012/167244 | A1 | 12/2012 | A01B 5/00 |
| WO | WO 2013/025898 | A1 | 2/2013 | B60C 23/02 |

OTHER PUBLICATIONS

Buffalo Farm Equipment All Flex Cultivator Operator Manual, Apr. 1990 (7 pages).
Shivvers, Moisture Trac 3000 Brochure, Aug. 21, 1990 (5 pages).
The New Farm, "*New Efficiencies in Nitrogen Application*," Feb. 1991, p. 6 (1 page).
Hiniker Company, Flow & Acreage Continuous Tracking System Monitor Demonstration Manuel, date estimated as early as Feb. 1991 (7 pages).
Russnogle, John, "*Sky Spy: Gulf War Technology Pinpoints Field and Yields*," Top Producer, A Farm Journal Publication, Nov. 1991, pp. 12-14 (4 pages).
Borgelt, Steven C., "*Sensor Technologies and Control Strategies for Managing Variability*," University of Missouri, Apr. 14-16, 1992 (15 pages).
Buffalo Farm Equipment Catalog on Models 4600, 4630, 4640, and 4620, date estimated as early as Feb. 1992 (4 pages).
Hiniker 5000 Cultivator Brochure, date estimated as early as Feb. 1992 (4 pages).
Hiniker Series 5000 Row Cultivator Rigid and Folding Toolbar Operator's Manual, date estimated as early as Feb. 1992 (5 pages).
Orthman Manufacturing, Inc., Rowcrop Cultivator Booklet, date estimated as early as Feb. 1992 (4 pages).
Yetter Catalog, date estimated as early as Feb. 1992 (4 pages).
Exner, Rick, "*Sustainable Agriculture: Practical Farmers of Iowa Reducing Weed Pressure in Ridge-Till*," Iowa State University University Extension, http://www.extension.iastate.edu/Publications/SA2.pdf, Jul. 1992, Reviewed Jul. 2009, retrieved Nov. 2, 2012 (4 pages).
Finck, Charlene, "*Listen to Your Soil*," Farm Journal Article, Jan. 1993, pp. 14-15 (2 pages).
Acu-Grain, "*Combine Yield Monitor 99% Accurate? 'You Bet Your Bushels!!*'" date estimated as early as Feb. 1993 (2 pages).
John Deere, New 4435 Hydro Row-Crop and Small-Grain Combine, date estimated as early as Feb. 1993 (8 pages).
Vansichen, R. et al., "*Continuous Wheat Yield Measurement on a Combine*," date estimated as early as Feb. 1993 (5 pages).
Yetter 2010 Product Catalog, date estimated as early as Jan. 2010 (2 pages).
Yetter Cut and Move Manual, Sep. 2010 (28 pages).
John Deere, Seat Catalog, date estimated as early Sep. 2011 (19 pages).
Martin Industries, LLC Paired 13" Spading Closing Wheels Brochure, date estimated as early as Jun. 6, 2012, pp. 18-25 (8 pages).
Vogt, Willie, "*Revisiting Robotics*," http://m.farmindustrynews.com/farm-equipment/revisiting-robtoics, Dec. 19, 2013 (3 pages).
John Deere, New Semi-Active Sea Suspension, http://www.deere.com/en_US/parts/agparts/semiactiveseat.html, date estimated as early as Jan. 2014, retrieved Feb. 6, 2014 (2 pages).

* cited by examiner

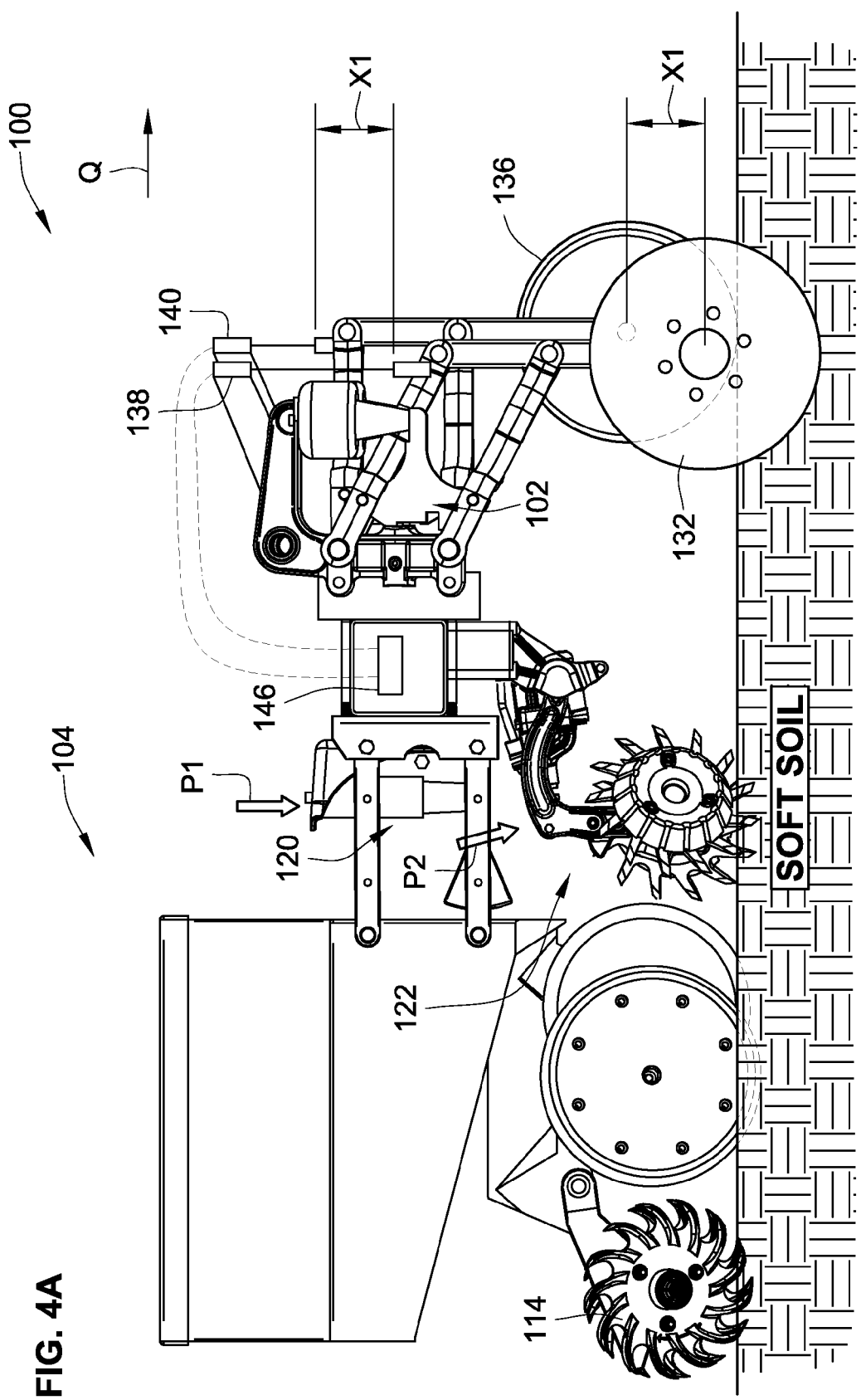

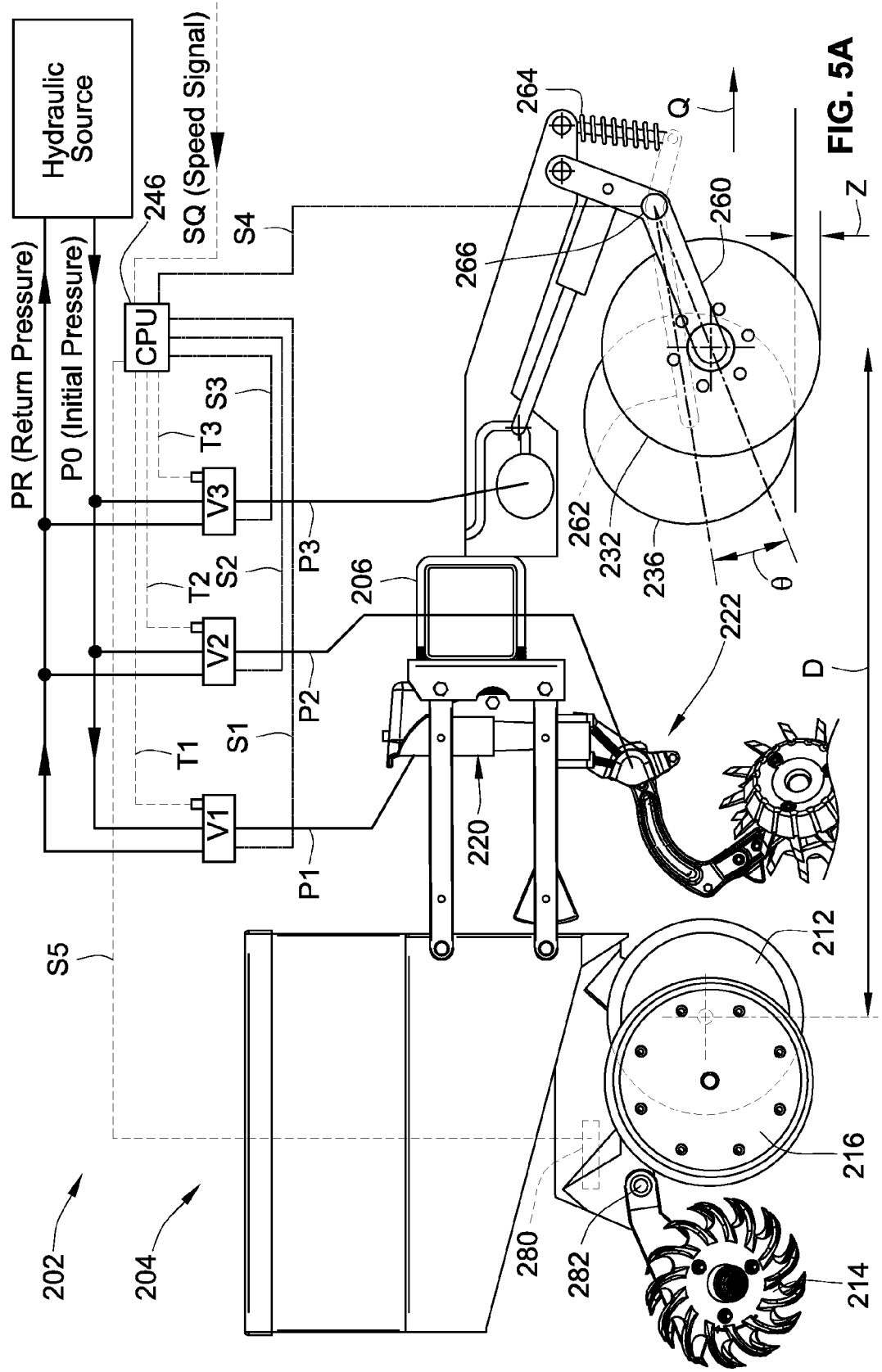

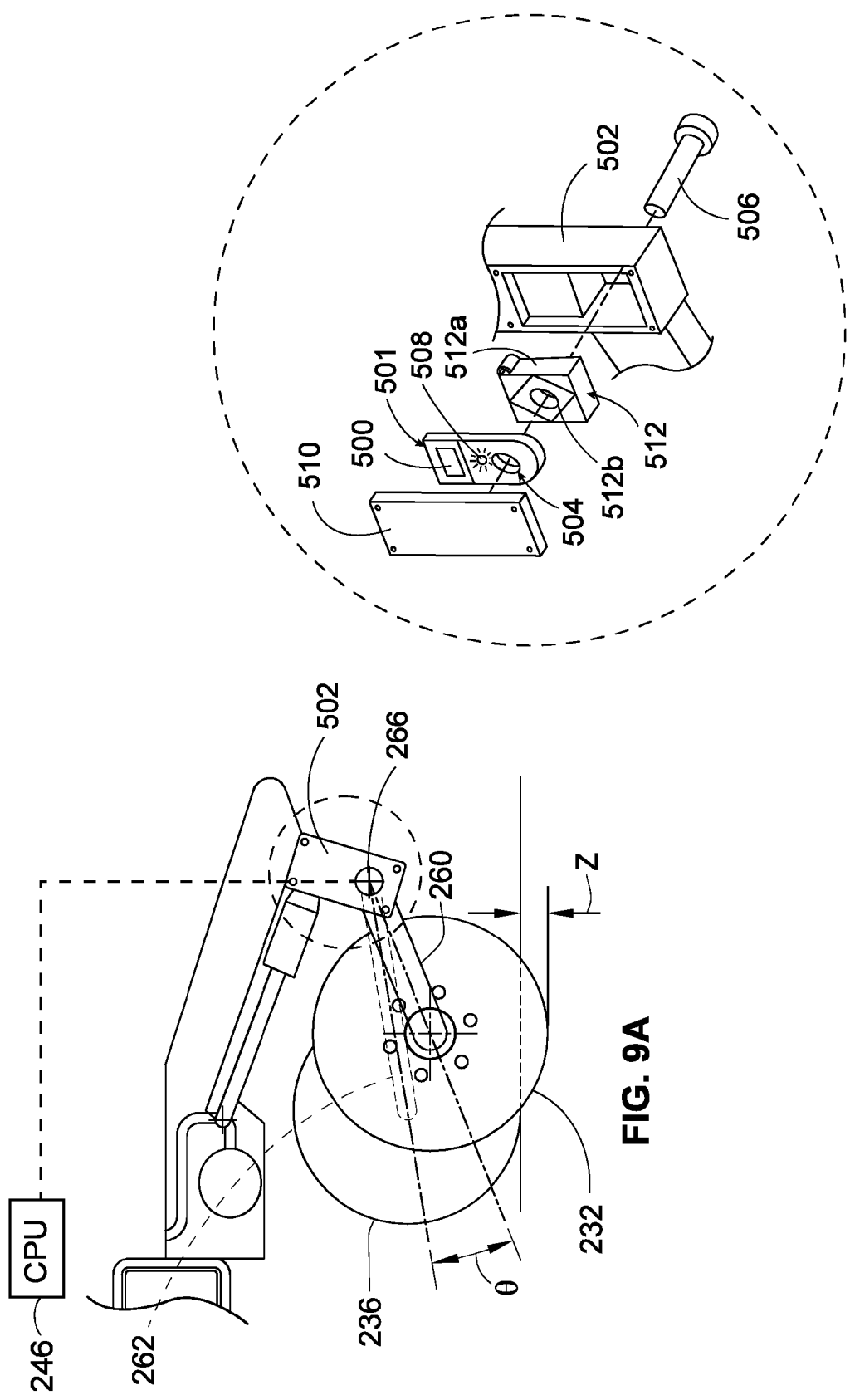

AGRICULTURAL APPARATUS FOR SENSING AND PROVIDING FEEDBACK OF SOIL PROPERTY CHANGES IN REAL TIME

CROSS-REFERENCE TO RELATED APPLICATION

This application is a continuation-in-part of U.S. patent application Ser. No. 13/839,669, titled "Agricultural Apparatus For Sensing And Providing Feedback Of Soil Property Changes In Real Time" and filed on Mar. 15, 2013, which is a continuation-in-part of U.S. patent application Ser. No. 13/589,829, titled "Agricultural Apparatus For Sensing And Providing Feedback Of Soil Property Changes In Real Time" and filed on Aug. 20, 2012, which is incorporated herein in its entirety.

FIELD OF THE INVENTION

The present invention relates generally to agricultural equipment and, more particularly, to a row crop implement having a soil sensor for providing down-pressure control feedback in real time.

BACKGROUND OF THE INVENTION

In agricultural operations, it is known to measure a force exerted on gauge wheels of an agricultural implement (e.g., a row crop planter), with a load cell or some other device. Based on this force, a signal is transmitted to an actuator that exerts a down-pressure force on the implement. The signal causes the actuator to change the down-pressure force, in response to a change in soil conditions, and achieve a desired force on the row crop planter.

Moreover, it is common in agricultural operations for small, localized, and compacted soil areas to be formed by tire tracks, topography changes, or soil type. These compacted soil areas cause the soil conditions to change, for example, from a hard soil condition to a soft soil condition. Current agricultural systems, however, react to signals caused by a compacted soil area after the implement has already passed over that compacted soil area. As such, current agricultural systems fail to apply a correct level of pressure for the soil that is immediately beneath the implement. Instead, when a new soil condition is detected in a particular field location, current agricultural systems apply the level of pressure associated with the new soil condition either before or after the implement has passed the particular field location. This results in inefficient and/or improper soil preparation for agricultural applications, such as planting or tilling, which, in turn, causes a decrease in crop quality and volume.

SUMMARY OF THE INVENTION

In accordance with one embodiment, a planting row unit is attachable to a towing frame and is movable in a forward direction on a field having soil of varying hardness conditions. The planting row unit includes an opener device forward of the towing frame for preparing the soil for receiving at least one of the fertilizer and the seeds. The opener device includes a soil-hardness sensor for detecting changes in soil-hardness conditions and an opener blade for maintaining, in response to the changes, a constant soil-penetration depth Z in the soil independent of the varying hardness conditions. A modular actuator is mounted to the opener device for applying pressure to the opener blade, the modular actuator being mountable to at least one other component of the planting row unit for applying pressure.

In accordance with another embodiment, an agricultural system includes a plurality of planting row units that is attached to the towing frame in a side-by-side arrangement. The plurality of planting row units is movable in a forward direction on a field having soil of varying hardness conditions, the soil including a soft soil and a hard soil. At least one of the plurality of planting row units includes an opener device forward of the towing frame for preparing the soil for receiving at least one of the fertilizer and the seeds. The opener device includes a soil-hardness sensor for detecting changes in soil-hardness conditions, and an opener blade for maintaining, in response to the changes, a constant soil-penetration depth Z in the soil independent of the varying hardness conditions. The opener device also includes a modular actuator mounted to the opener device for applying pressure to the opener blade, the modular actuator being mountable to at least one other component of the planting row unit for applying pressure.

BRIEF DESCRIPTION OF THE DRAWINGS

The invention may best be understood by reference to the following description taken in conjunction with the accompanying drawings, in which:

FIG. 4A is a side elevation of an agricultural system moving over soft soil conditions.

FIG. 5A is a schematic side elevation illustrating sensing of soil conditions and determining of hydraulic pressures for a planting row unit.

FIG. 9A is side elevation illustrating an alternative embodiment of the soil-hardness sensing device with a modified blade arm.

FIG. 9B is an enlarged exploded illustration of a distal end of the blade arm.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
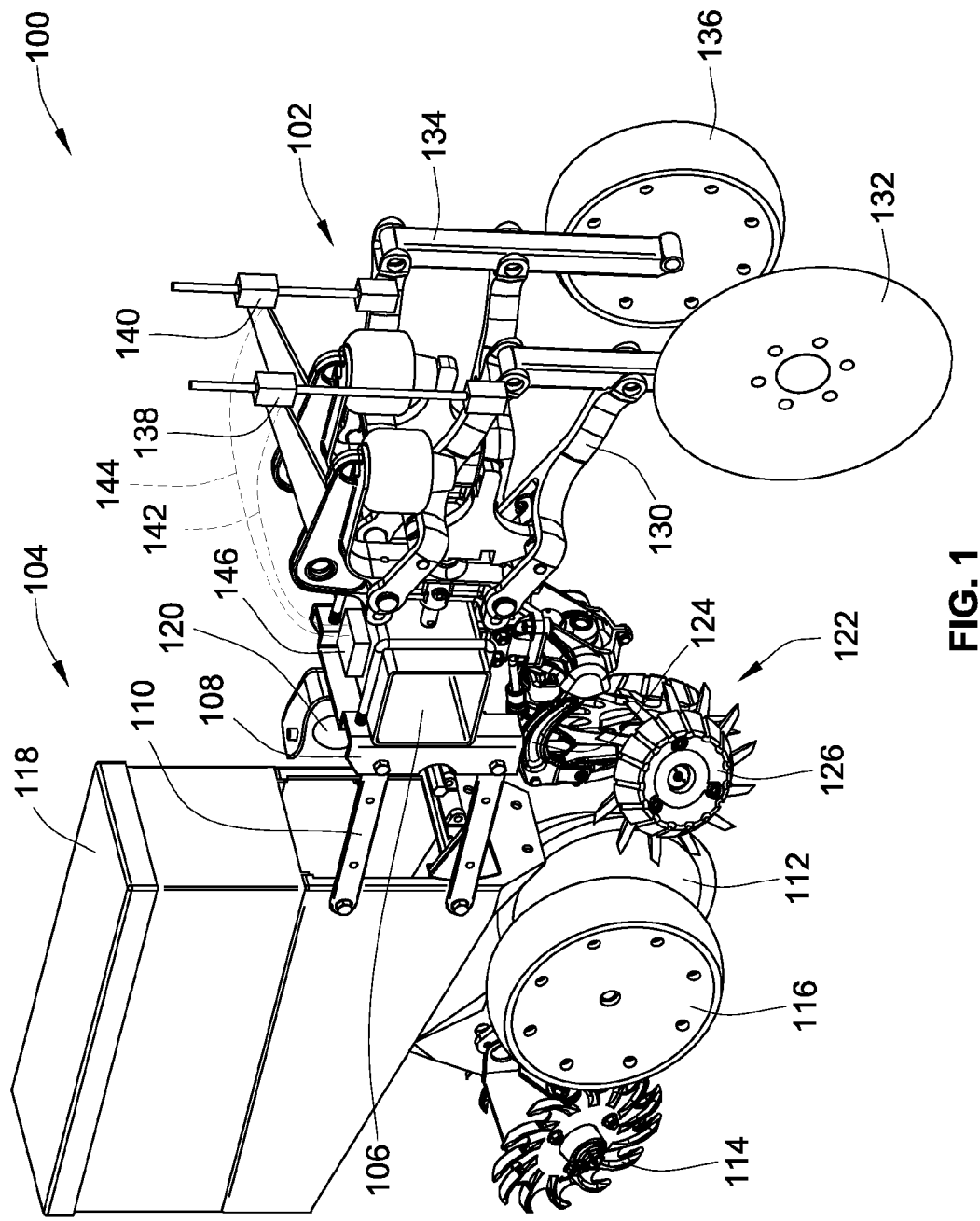
FIG. 1 is a perspective view of a soil-hardness sensing device attached to a planting row unit.

Referring to FIG. 1, an agricultural system 100 includes a soil-hardness sensing device 102 attached in front of an agricultural row unit 104 (also referred to as a planting row unit) via a towing frame 106. The towing frame 106 is generally a common elongated hollow frame that is typically hitched to a tractor by a draw bar. The towing frame 106 is rigidly attached to a front frame 108 of a four-bar linkage assembly 110 that is part of the row unit 104. The four-bar (sometimes referred to as "parallel-bar") linkage assembly 110 is a conventional and well known linkage used in agricultural implements to permit the raising and lowering of tools attached thereto.

As the planting row unit 104 is advanced by the tractor, a pair of cooperating toothed clearing wheels 122 work the soil and then other portions of the row unit, such as a V-opener disk 112, part the cleared soil to form a seed slot, deposit seed in the seed slot and fertilizer adjacent to the seed slot, and close the seed slot by distributing loosened soil into the seed slot with a closing wheel 114. According to one example, the closing wheel 114 is a CUVERTINE™ closing wheel sold by the assignee of the present application. The CUVERTINE™ closing wheel is an efficient toothed wheel in-between a spading wheel and a rubber wheel.

A gauge wheel 116 of the planting row unit 104 determines the planting depth for the seed and the height of introduction of fertilizer, etc. One or more bins 118 on the planting row unit 104 carry the chemicals and seed that are directed into the soil.

The planting row unit 104 is urged downwardly against the soil by its own weight. To increase this downward force, or to be able to adjust the force, a hydraulic or pneumatic actuator 120 (and/or one or more springs) is added between the front frame 108 and the four-bar linkage assembly 110 to urge the planting row unit 104 downwardly with a controllable force. Such a hydraulic actuator 120 may also be used to lift the row unit off the ground for transport by a heavier, stronger, fixed-height frame that is also used to transport large quantities of fertilizer for application via multiple residue-clearing and tillage row units. According to one example, the hydraulic actuator 120 is an RFX™ system sold by the assignee of the present application. The RFX™ system includes a down-pressure actuator that is a compact, fast action actuator, and that is remotely controlled. The RFX™ system includes an nitrogen pressure-vessel that is integrated with the down-pressure actuator. According to other examples, the hydraulic or pneumatic actuator 120 may be controlled to adjust the downward force for different soil conditions such as is described in U.S. Pat. Nos. 5,709,271, 5,685,245 and 5,479, 992.

The planting row unit 104 further includes a row-clearing unit 122 having a pair of rigid arms 124 adapted to be rigidly connected to the towing frame 106. According to one example, the row-clearing unit 122 is a GFX™ system (i.e., ground effects row cleaner), which is sold by the assignee of the present application, that is a hydraulically-controlled row cleaner. The GFX™ system is a hydraulically-controlled row cleaner with spring upward pressure and hydraulic down pressure. Furthermore, the GFX™ system is remotely adjusted.

At the bottom of the row-clearing unit 122, the pair of cooperating toothed clearing wheels 126 are positioned upstream of the V-opener disk 112 of the planting row unit 104. The clearing wheels 126 are arranged for rotation about transverse axes and are driven by the underlying soil as the wheels are advanced over the soil. The illustrative clearing wheels 126 are a type currently sold by the assignee of the present invention under the trademark TRASHWHEEL™. The clearing wheels 126 cooperate to produce a scissors action that breaks up compacted soil and simultaneously clears residue out of the path of planting. The clearing wheels 126 kick residue off to opposite sides, thus clearing a row for planting. To this end, the lower edges are tilted outwardly to assist in clearing the row to be planted. This arrangement is particularly well suited for strip tilling, where the strip cleared for planting is typically only about 10 inches of the 30-inch center-to-center spacing between planting rows.

The soil-hardness sensing device 102 has a first linkage 130 with an attached blade 132 and a second linkage 134 with an attached gauge wheel 136. According to one example, the linkages are medium FREEFARM™ linkages sold by the assignee of the present application. The FREEFARM™ linkages are generally a modular set of parallel linkages used for different purposes. Also, according to one example, the soil-hardness sensing device 102 is a FORESIGHT AND CFX™ ground hardness sensor that is sold by the assignee of the present application.

The two linkages 130, 134 are parallel to each other and each has a down pneumatic pressure that is controlled independently. Under constant pneumatic pressure, when the soil-hardness sensing device 102 is moved through the field, the blade 132 penetrates the soil deeper in soft soil and shallower in hard soil. However, the wheel 136 rides on the soil surface regardless of the type of soil.

Each linkage 130, 134 has a high quality all-stainless steel linear position sensor 138, 140 enclosed in a protecting housing, with a cable 142, 144 routed to a central processing unit (CPU) 146, which includes a memory device for storing instructions and at least one processor for executing the instructions. When the blade 132 or the wheel 136 moves, a corresponding change in value is recorded on the respective position sensors 138, 140. The two values from the position sensors 138, 140 are outputted as fast as approximately 1,000 times/second and are fed as soil-hardness signals to the CPU 146, which is a rugged outdoor-rated programmable logic controller that measures the difference in the two values in real time.

In the illustrated example, the CPU 146 is positioned on the planting row unit 104. However, in other embodiments the CPU 146 may be positioned remote from the planting row unit 104, e.g., in a tractor cabin, on a different planting row unit of a side-by-side row unit arrangement, etc. Furthermore the processor and the memory device of the CPU 146 can be located in the same place, e.g., on the planting row unit 104, or in different places, e.g., the processor can be located on the planting row unit 104 and the memory device can be located in the tractor cabin.

The CPU 146 averages the values over a predetermined time period (e.g., 0.25 seconds), executes an algorithm with filtering effects (e.g., removes conditions in which a rock is hit by the soil-hardness sensing device 102), and provides real-time measurement of the soil hardness. The CPU 146 optionally receives other user-controllable variables for adjusting/tuning the agricultural system 100. For example, the user-controllable variables include values for different residue levels, different initial conditions, etc.

Figure 2:
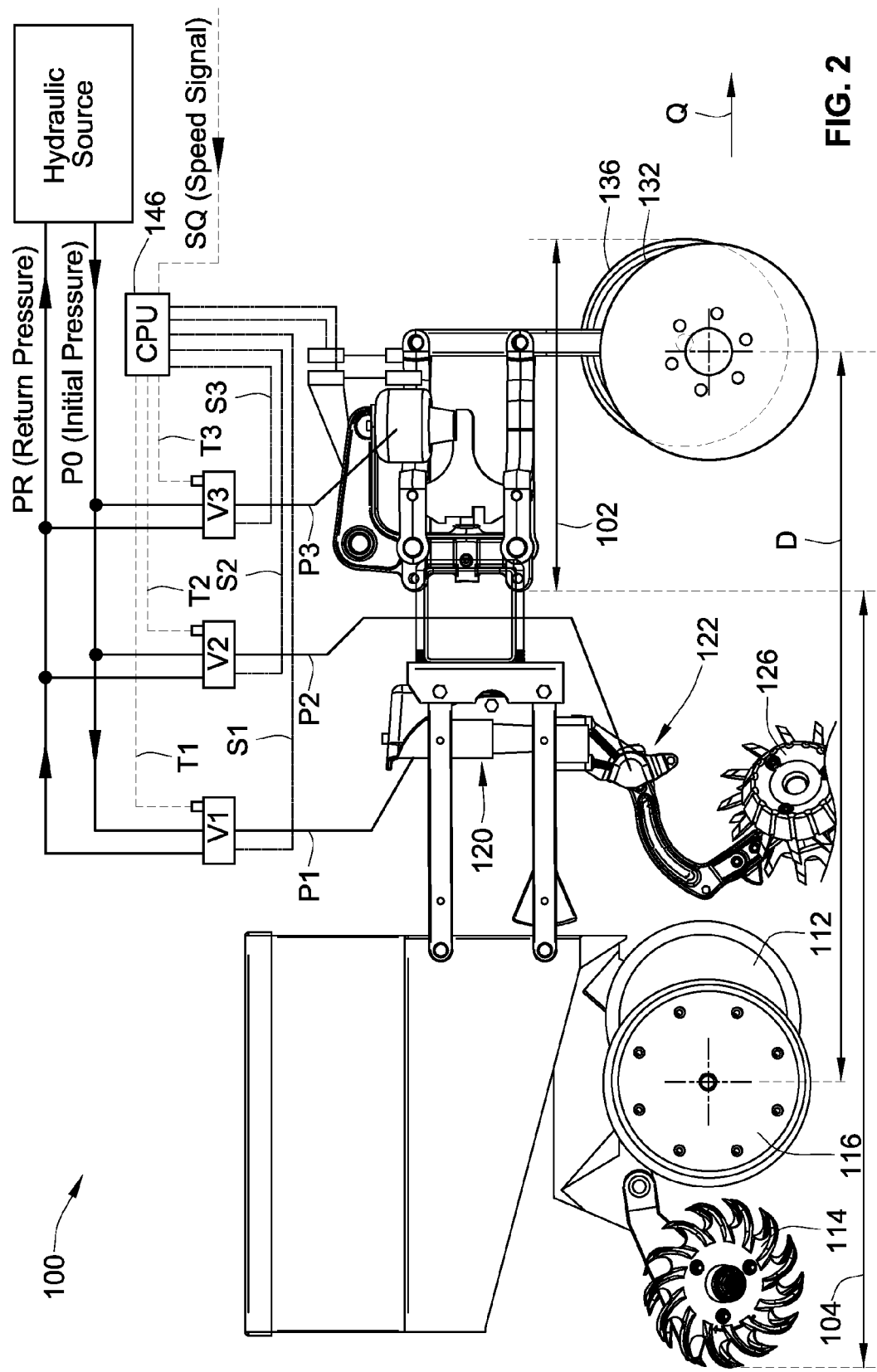
FIG. 2 is a schematic side elevation illustrating the soil-hardness device attached to the planting row unit.

Referring to FIG. 2, the agricultural system 100 receives hydraulic fluid from a hydraulic source, typically located in the tractor, at a hydraulic input pressure P0. The hydraulic fluid is directed to each one of a plurality of hydraulic control valves V1-V3. The CPU 146 outputs a respective signal S1-S3 to the control valves V1-V3, which create a proportional output/change in the pressure of hydraulic circuits, virtually instantaneously changing the pressure in real time as the agricultural system 100 moves through a field. The pressure changes are useful, for example, when the agricultural system 100 encounters hardened soil areas in which combines or grain carts have previously compacted the soil. The agricultural system 100 optimizes the pressure to achieve a desired depth control by applying the right amount of pressure at the right time.

To achieve the right amount of pressure for each controllable component (e.g., the hydraulic actuator 120, the row-clearing unit 122, and the soil-hardness sensing device 102), the CPU 146 outputs the respective signals S1-S3 to the associated control valves V1-V3. For example, in response to receiving a first signal S1 from the CPU 146, a first control valve V1 outputs a proportional first pressure P1 to the hydraulic actuator 120 (e.g., RFX™ system) for urging the planting row unit 104 downwardly. Similarly, in response to receiving a second signal S2 from the CPU 146, a second control valve V2 outputs a proportional second pressure P2 to the row-clearing unit 122 (e.g., GFX™ system). The RFX™ system 120 and the GFX™ system 122 are controlled independently because residue typically exhibits non-linear behavior. In other words, the independent control of the two systems 120, 122 is likely to achieve better depth-control results.

A third control valve V3 receives a third signal S3 from the CPU 145, in response to which the third control valve outputs a proportional third pressure P3 to the soil-hardness sensing device 102 (e.g., FORESIGHT AND CFX™ system). The control valves V1-V3 return hydraulic fluid to the hydraulic source at a return pressure PR. Respective transducers for each of the control valves V1-V3 may be used to verify that hydraulic output matches the desired value. If the hydraulic output does not match the desired value, the hydraulic output is corrected. Furthermore, each of the control valves V1-V3 has a respective valve response time T1-T3, which are discussed in more detail below in reference to determining the timing of applying the appropriate pressures P1-P3.

The CPU 146 further receives an input speed signal SQ indicative of a speed Q of the agricultural system 100, which moves typically at about 6 miles per hour, i.e., about 8.8 feet per second. As discussed in more detail below, the speed signal SQ is used to determine the values of pressures P1-P3 based on current soil conditions. Furthermore, as discussed in more detail below, the CPU 146 further outputs two signals, a sensor signal SCFX to the soil-hardness sensing device 102 and a closing wheel SCW to the closing wheel 114.

The soil-hardness sensing device 102 is positioned in front of the planting row unit 104 at a distance D (which is measured generally from a center line of the blade 132 to a center line of the V-opener disk 112), which can be obtained based on the following formula:

$$Q(\text{speed}) = D(\text{distance})/T(\text{time interval}) \quad \text{Equation 1}$$

Thus, the distance D is calculated as follows:

$$D = Q * T \quad \text{Equation 2}$$

If D is a known distance (e.g., the distance between the sensed position and position where seed-depositing position) and the speed Q is also known, changes in soil conditions can be anticipated in real time prior to the planter row unit 104 arriving to the particular soil-change area. For example, assuming that Q is approximately 8.8 feet per second and T is approximately 0.25 seconds, D should be approximately equal to or greater than 2.2 feet. In other words, the minimum distance for D should be approximately 2.2 feet. If D is greater than the minimum value (e.g., D is greater than 2.2 feet), the agricultural system 100 is calibrated to account for the additional distance. For example, the CPU 146 will send the respective signals S1, S2 to the associated control valves V1, V2 only after a predetermined period of time Tact, as discussed in more detail below.

Pressures P1 and P2 are to be applied only when matched with the corresponding soil conditions. For example, P1 and P2 are increased exactly at the time when harder soil conditions are encountered directly below the planting row unit 104. To properly time the change in pressures P1 and P2 correctly, a time variable R refers to the latent processing speed of CPU 146 and accounts for the time between (a) receiving an input signal by the CPU 146, (b) sending output signals S1, S2 by the CPU 146, and (c) responding to the output signals S2, S2 by the control valves V1, V2 with respective outputting pressures P1, P2.

It is noted that each of the control valves V1, V2 has a minimum input time Tmin, and that the distance D (e.g., as measured between the center of the blade 232 and the center of the V-opener disk 212) is directly proportional to the speed Q multiplied by the minimum input time Tmin of the respective control valve V1, V2. It is further noted that a theoretical time Ttheor is directly proportional to the distance D divided by the speed Q (i.e., D/Q), and that an actual time Tact is directly proportional to the theoretical time Ttheor minus the time variable R (i.e., Ttheor−R). Based on these conditions, for outputting pressures P1 and P2, the CPU 146 holds in memory output signals S1 and S2 for a time duration that is equal to the actual time Tact. After the actual time Tact has elapsed, the CPU 146 outputs signals S1 and S2, respectively, to the control valves V1, V2, which respond by outputting pressures P1, P2. Optionally, signals S1 and S2 are outputted as signals ranging between 0-10 volts.

Figure 3:
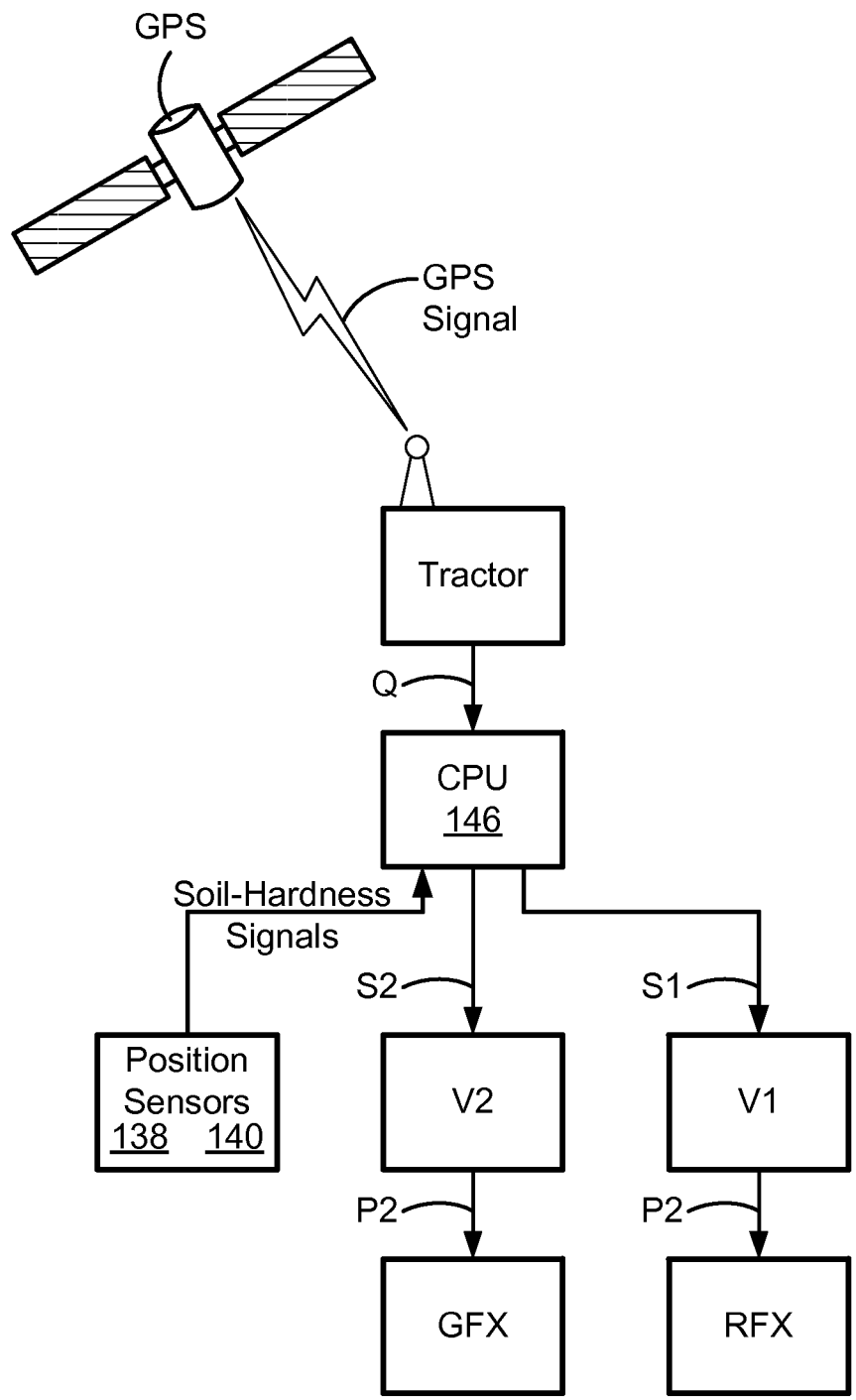
FIG. 3 is a schematic diagram illustrating the determination of hydraulic pressures for a planting row unit.

Referring to FIG. 3, a global positioning system (GPS) provides a GPS signal indicative of the speed Q to the tractor. Optionally, for example, the speed Q can be generated from a radar system. The speed Q is inputted to the CPU 146, along with the soil-hardness signals received from the position sensors 138, 140. Based on the speed Q and the soil-hardness signals, the CPU 146 outputs signals S1 and S2 to the control valves V1, V2, which output proportional pressures P1 and P2 for adjusting, respectively, the RFX™ system 120 and the GFX™ system 122.

Figure 4B:
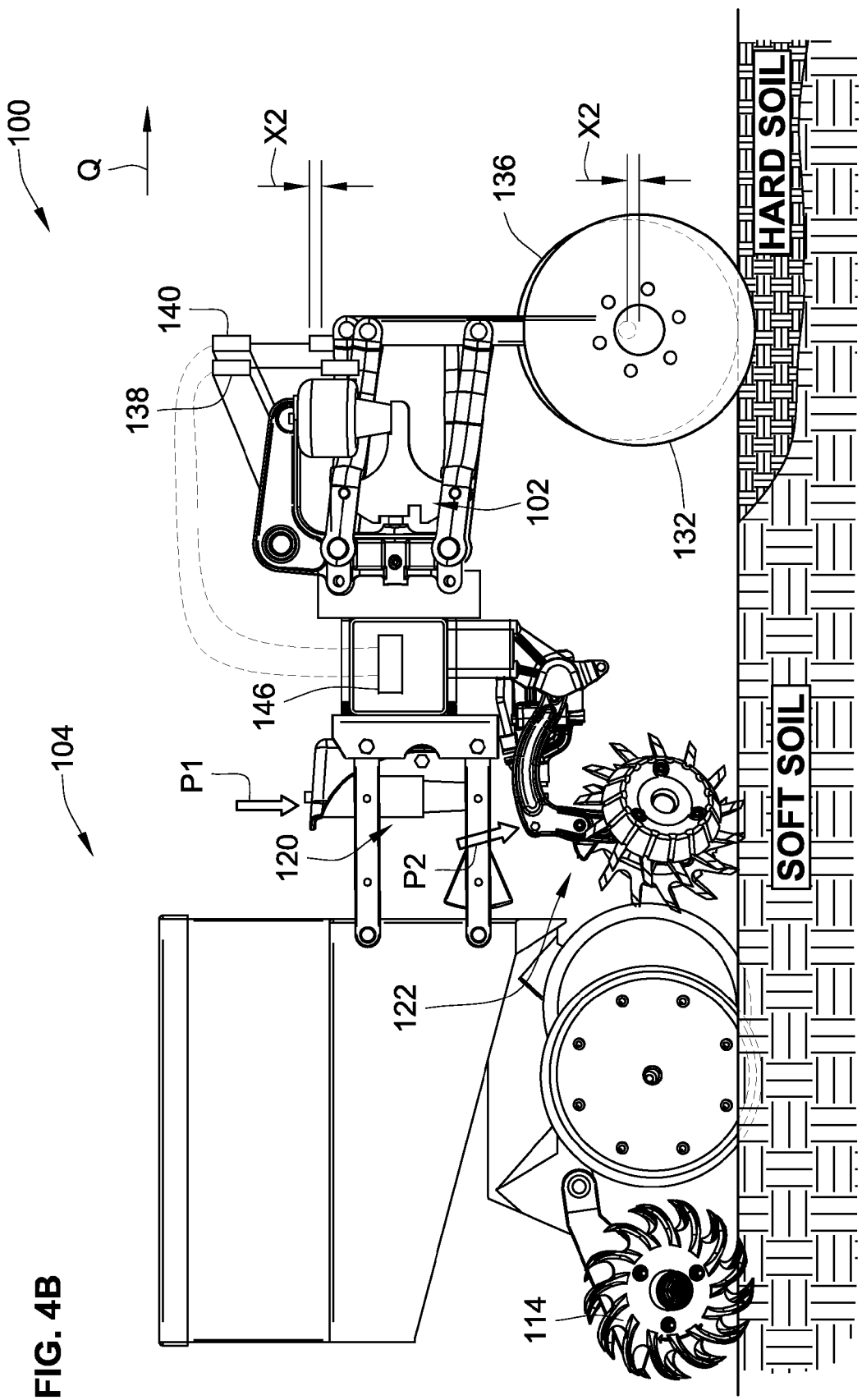
FIG. 4B is a side elevation of the agricultural system of FIG. 4A in which a soil-hardness sensing device is moving over hard soil conditions.
Figure 4C:
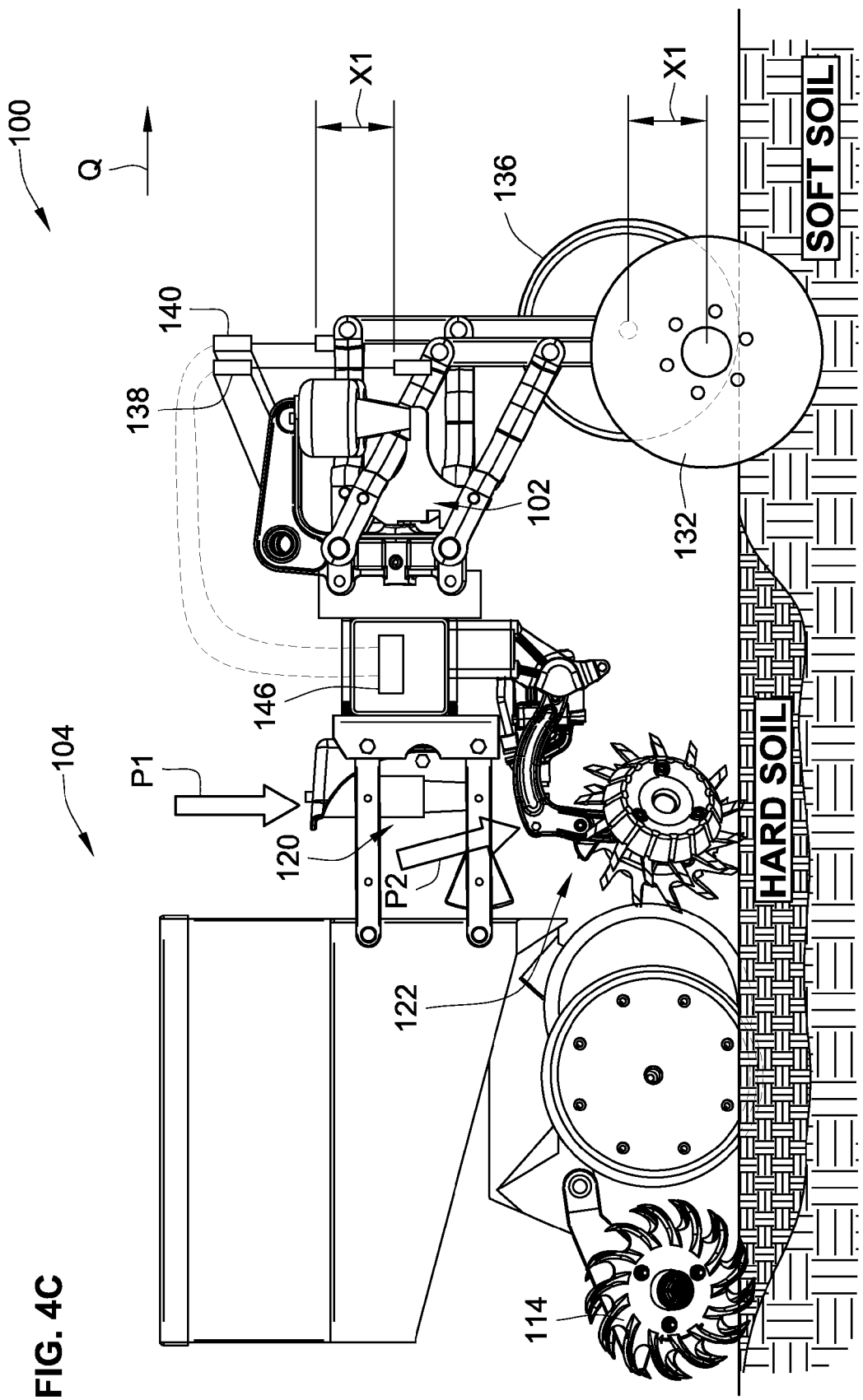
FIG. 4C is a side elevation of the agricultural system of FIG. 4B in which a planting row unit is moving over the hard soil conditions.

Referring to FIGS. 4A-4C, the agricultural system 100 encounters various types of soil-hardness conditions, which, for ease of understanding, will include soft soil conditions and hard soil conditions. The soft soil conditions exemplify typical soil conditions, and the hard soil conditions exemplify compacted soil areas, e.g., areas compacted by tire tracks of tractors or combines.

Referring specifically to FIG. 4A, the agricultural system 100 is moving forward at a speed Q over an initial soil area having only soft soil conditions. Based on the soft soil, the blade 132 penetrates the soil at a distance X1 lower than the wheel 136 (which rides on the soil surface). The distance X1 is the difference between the position sensors 138, 140. In accordance with the distance X1, which is associated with soft soil conditions, corresponding pressures P1 and P2 are applied to the hydraulic actuator 120 and the row-clearing unit 122.

Referring specifically to FIG. 4B, the blade 132 and the wheel 136 (but not the planting row unit 104) are now moving over a soil area of hard soil conditions. Because the soil is now much harder than the previous soil area, the blade 132 cannot penetrate the soil as much as in the previous soil area. As such, the blade 132 rises higher relative to the soil surface and penetrates the soil only at a distance X2 lower than the wheel 136 (which continues to ride on the soil surface). The distance X2 is the distance determined by the CPU 146 based on the corresponding change in value outputted by the position sensors 138, 140. However, although the distance X2 (which is associated with hard soil conditions) is different than the previous distance X1 (which is associated with soft soil conditions), the corresponding pressures P1 and P2 are not changed, yet, because the planting row unit 104 has not reached the hard-soil area.

Referring specifically to FIG. 4C, the planting row unit 104 is now moving over the hard-soil area, which the blade 132 and the wheel 136 have already passed. At this point in time, and only at this point in time, the pressures P1 and P2 are increased to maintain the desired depth level. Thus, although the soil-hardness sensing device 102 has reached, again, soft soil conditions that allow the blade 132 to penetrate the soil at the previous distance X1, the pressures P1 and P2 are adjusted in accordance with the hard soil conditions.

Referring to FIG. 5A, another exemplary soil-hardness sensing device 202 is attached to a towing frame 206 and includes a planting row unit 204 having a V-opener disk 212, a closing wheel 214, and a row-unit gauge wheel 216. The planting row unit 204 further includes a hydraulic actuator 220 that responds to a pressure P1 and a row-clearing unit 222 that responds to a pressure P2. The soil-hardness device 202 and the planting row unit 204 are generally similar to the soil-hardness device 102 and the planting row unit 104 described above in reference to FIGS. 1-4C, except for any changes described below.

In this embodiment the soil-hardness device 202 can be a device that is already included in the planting row unit 204, such as a cutting coulter running directly in-line with the planter row unit or a fertilizer opener positioned off to a side of the planted area. Thus, assuming a side-by-side arrangement of row units, the soil-hardness device can take the form of a fertilizer opener or a no-till cutting coulter in front of or to the side of every row unit.

The soil-hardness device 202 includes a blade 232 and a soil-hardness gauge wheel 236. The blade 232 is attached to a blade arm 260 and the soil-hardness gauge wheel 236 is attached to a wheel arm 262. The wheel arm 262 is biased down by a spring 264 and pivots relative to the blade arm 260. An angular encoder 266 measures changes in an angle θ between the blade arm 260 and the wheel arm 262. The angle θ is directly proportional to the depth of the blade 232 relative to the soil-hardness gauge wheel 236.

The angle θ is sent to a CPU 246 which executes an algorithm to determine corresponding pressure values for the planting row unit 204. A minimum angle θmin is equal to angle θ when both the blade 232 and the soil-hardness gauge wheel 236 are on the soil surface, e.g., when passing over very hard soil conditions or a concrete floor. A depth variable Z indicates a desired blade depth, i.e., blade 232 penetration into the soil. The angle θ is directly proportional to the depth variable Z, which has a range between an actual (or current) depth value Zact and a theoretical depth value Ztheor.

By way of comparison, in the soil-hardness device 202 of the current embodiment a controllable pressure P3, which is applied to the soil-hardness device 202, is varied, but the angle θ between the blade 232 and the soil-hardness gauge wheel 236 is maintained generally constant, with the blade 232 penetrating the soil at a desired blade depth Z. In contrast, in the soil-hardness device 102 described above in reference to FIGS. 4A-4C the difference between the blade 132 and the wheel 136 is varied (e.g., distances X1 and X2), but the pressure applied to the soil-hardness device 102 is maintained generally constant.

Figure 5B:
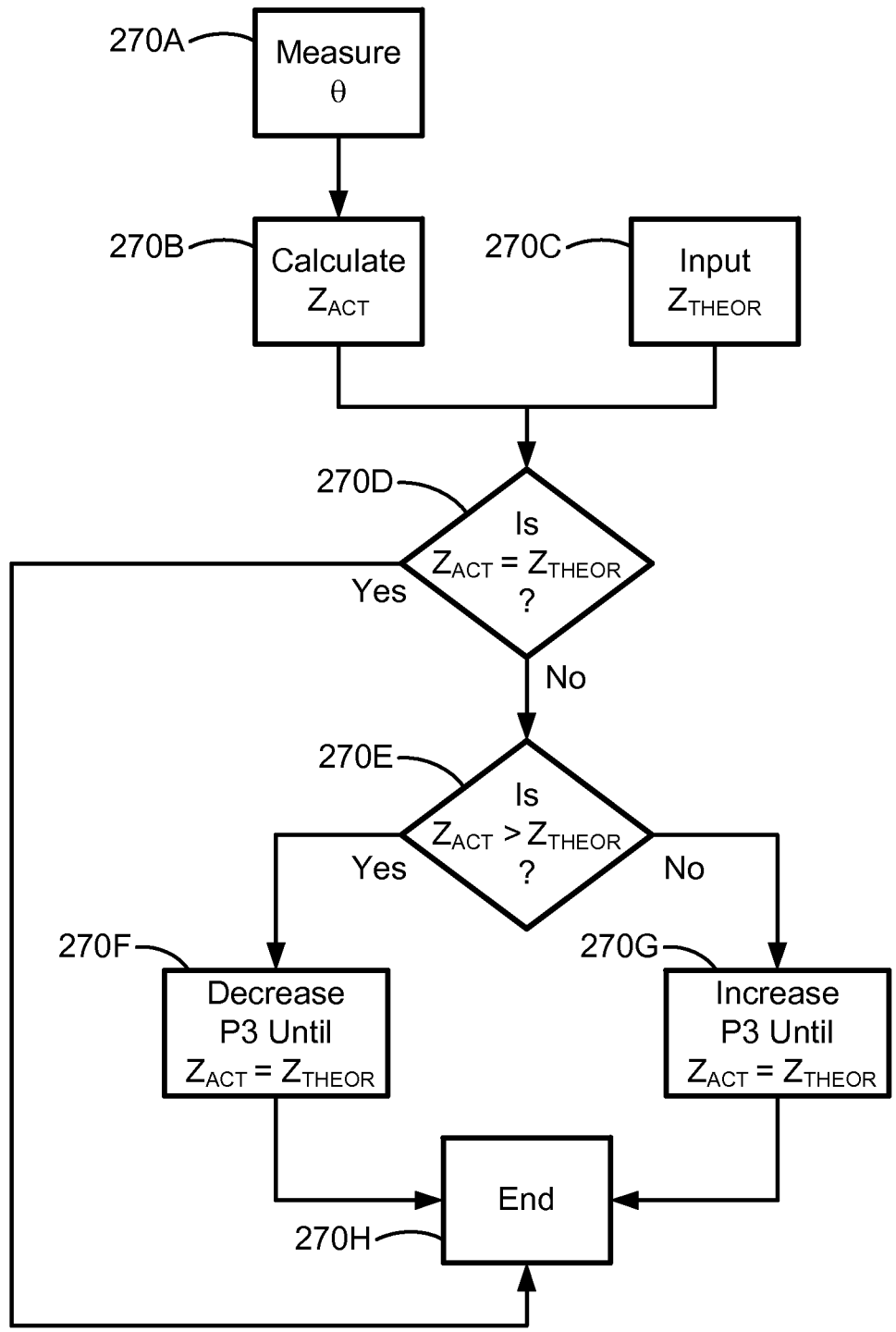
FIG. 5B is a flowchart of an algorithm for adjusting a pressure applied to a soil-hardness sensing device.

According to one aspect of the algorithm illustrated in FIG. 5B, the angle θ is measured (270A) and the actual depth value Zact is calculated (270B). Based on the actual depth value Zact and an inputted theoretical depth value Ztheor (270C), a determination is made whether the actual depth value Zact is equal to the theoretical depth value Ztheor (270D):

$$\text{If Zact=Ztheor=>end} \qquad \text{Equation 3}$$

If the actual depth value Zact is equal to the theoretical depth value Ztheor (i.e., Zact=Ztheor), the algorithm ends (until the next value is received) (270H). Optionally, if angle θ is less than minimum angle θmin (i.e., θ<θmin), algorithm ignores changes because those values typically illustrate that the soil-hardness sensing device 202 has hit a rock.

If the actual value of the depth variable Z is greater than the theoretical value of the depth variable Z (i.e., Zact>Ztheor) (270E), the controllable pressure P3 that is being applied to the soil-hardness device 202 is decreased until the actual value of the depth variable Z is equal to the theoretical value of the depth variable Z (i.e., Zact=Ztheor) (270F):

$$\text{If Zact>Ztheor=>decrease P3 until Zact=Ztheor} \qquad \text{Equation 4}$$

If the actual value of the depth variable Z is smaller than the theoretical value of the depth variable Z (i.e., Zact<Ztheor), then the controllable pressure P3 is increased until the actual value of the depth variable Z is equal to the theoretical value of the depth variable Z (i.e., Zact=Ztheor) (270G):

$$\text{If Zact<Ztheor=>increase P3 until Zact=Ztheor} \qquad \text{Equation 5}$$

Thus, according to this algorithm, the desired depth Z of the blade 232 is maintained constant by varying the pressure P3 in response to detected changes in the angle θ. To vary the pressure P3, a user-defined variable M (similar to the user-defined variables K and J described below) is increased or decreased to modify an actual value P3act of the pressure P3 until the desired depth variable Z is achieved. As such, assuming that a theoretical value P3theor of the pressure P3 is being applied to the blade 232 when the desired depth Ztheor is achieved, and further assuming that P3theor is directly proportional to M*P3act, M is modified until M*P3 act is equal to P3theor (and, consequently, the desired depth variable Z is achieved). For example, if the depth variable Z is too small, i.e., the blade 232 is running too shallow into the soil (e.g., the blade 232 is moving through a heavily compacted soil area), as detected by a change in the angle θ, M is increased until the actual pressure value P3act is equal to the theoretical value P3theor. Once the theoretical value P3theor is reached, the increased pressure forces the blade 232 into the soil at the desired depth. Furthermore changes to the pressure P1 and the pressure P2 can be effected based on M*P3act being directly proportional to P1 and P2.

Figure 5C:
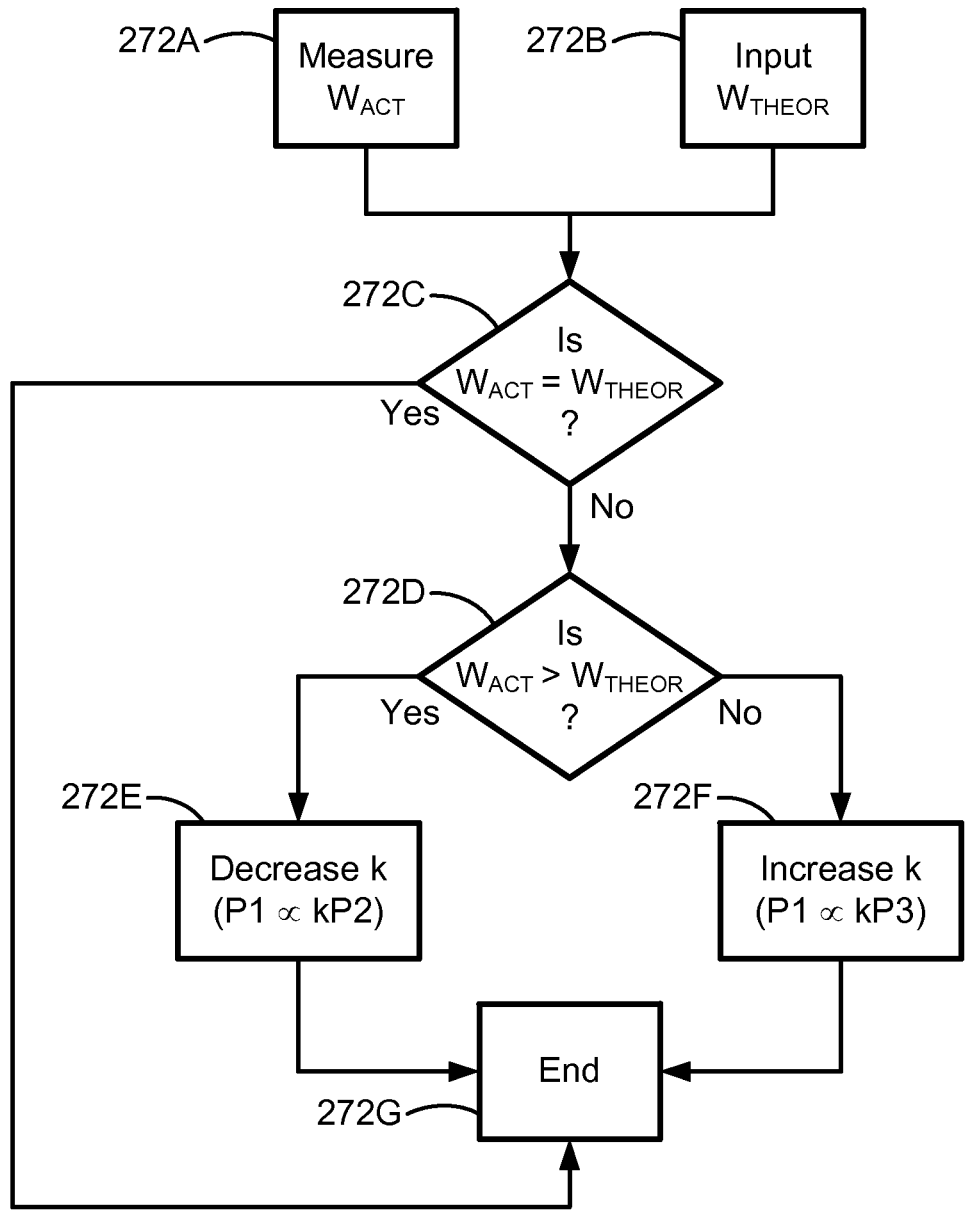
FIG. 5C is a flowchart of an algorithm for adjusting a user-defined variable associated with a pressure applied to a planting row unit.

According to another aspect of the algorithm, illustrated in FIG. 5C, if feedback is desired from the row-unit gauge wheel 216, to verify that the system is performing as desired (e.g., to verify that the appropriate pressure values are being applied to the planting row unit 204), a weight variable W is set in accordance with a desired weight. In this example, the pressure P1 applied to the hydraulic actuator 220 of the planting row unit 204 is directly proportional to a user-defined variable K multiplied by the pressure P3 applied to the soil-hardness device 202 (i.e., P1 is directly proportional to K*P3).

A signal S4 (illustrated in FIG. 5A), which is directly proportional to the weight variable W, is outputted by a gauge wheel load sensor 280 (illustrated in FIG. 5A) and averaged over a time period Tgauge. After measuring the actual weight value Wact (272A) and receiving the theoretical weight value Wtheor (272B), a determination is made whether the actual weight value Wact is equal to the theoretical weight value Wtheor (272C):

If Wact=Wtheor=>end　　　　　　　　　　Equation 6

If the actual weight value Wact is equal to the theoretical weight value Wtheor (i.e., Wact=Wtheor), the algorithm ends (272G) until the next measurement.

If the actual weight value Wact is greater than the theoretical weight value Wtheor (i.e., Wact>Wtheor), then the user-defined variable K is decreased (272E) until the actual weight value Wact is equal to the theoretical weight value Wtheor:

If Wact>Wtheor=>decrease K　　　　　　　Equation 7

If the actual weight value Wact is less than the theoretical weight value Wtheor (i.e., Wact<Wtheor), then the user-defined variable K is increased (272F) until the actual weight value Wact is equal to the theoretical weight value Wtheor:

If Wact<Wtheor=>increase K　　　　　　　Equation 8

The user-defined variable K can be set manually by a user or automatically via a load pin 282.

Figure 5D:
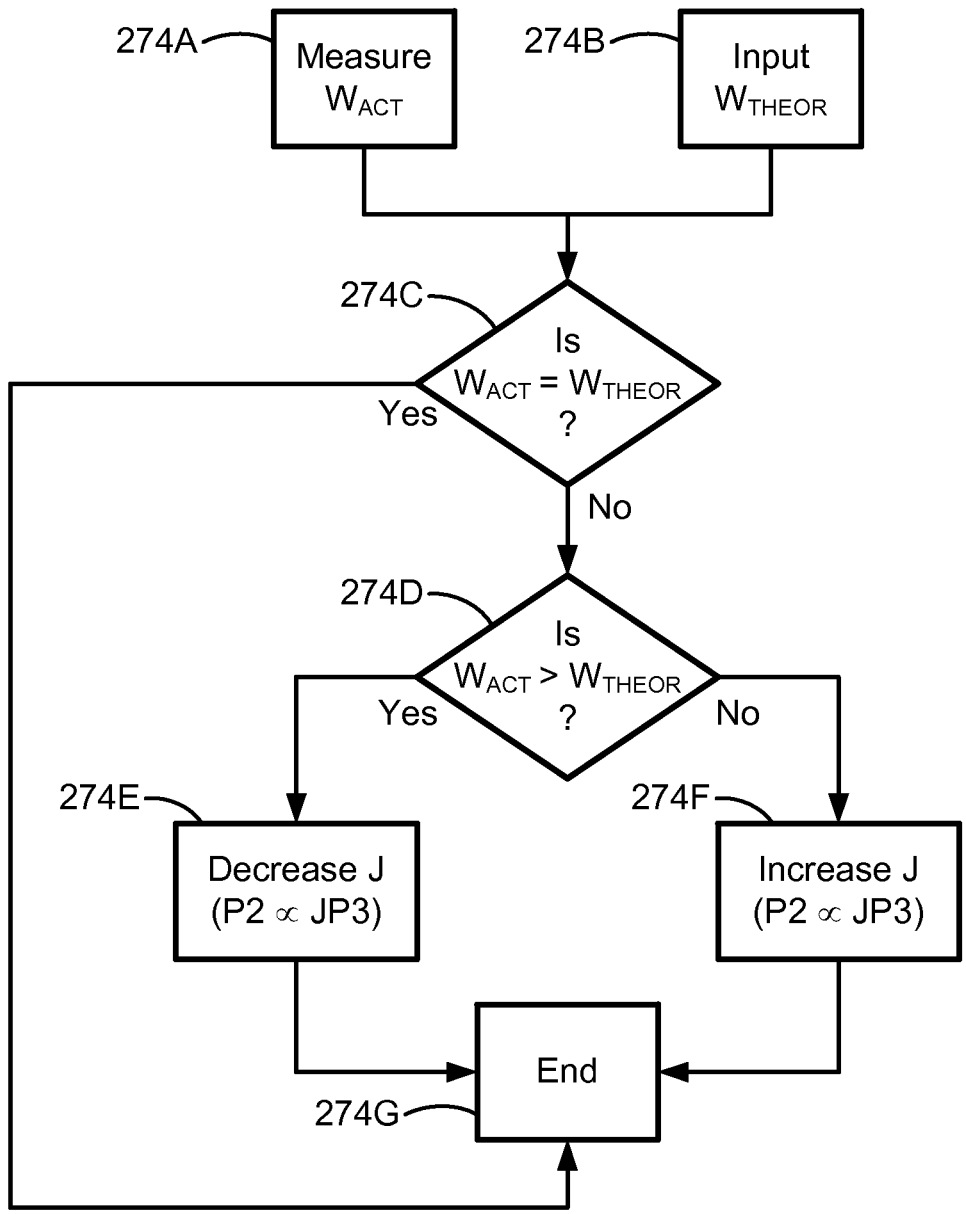
FIG. 5D is a flowchart of an algorithm for adjusting a user-defined variable associated with a pressure applied to a row-clearing unit.

Similarly, referring to FIG. 5D, the pressure P2 applied to the row-cleaner unit 222 can be adjusted by adjusting a user-defined variable J. Specifically, in this example, the pressure P2 is directly proportional to the user-defined variable J multiplied by the pressure P3 (i.e. P2 is directly proportional to J*P3). After measuring the actual weight value Wact (274A) and receiving the theoretical weight value Wtheor (274B), a determination is made whether the actual weight value Wact is equal to the theoretical weight value Wtheor (274C):

If Wact=Wtheor=>end　　　　　　　　　　Equation 9

If the actual weight value Wact is equal to the theoretical weight value Wtheor (i.e., Wact=Wtheor), the algorithm ends (274G) until the next measurement.

If the actual weight value Wact is greater than the theoretical weight value Wtheor (i.e., Wact>Wtheor), then the user-defined variable J is decreased (274E) until the actual weight value Wact is equal to the theoretical weight value Wtheor:

If Wact=Wtheor=>decrease J　　　　　　　Equation 10

If the actual weight value Wact is less than the theoretical weight value Wtheor (i.e., Wact<Wtheor), then the user-defined variable J is increased (274F) until the actual weight value Wact is equal to the theoretical weight value Wtheor:

If Wact=Wtheor=>increase J　　　　　　　Equation 11

The user-defined variable J can also be set manually by a user or automatically via the load pin 282.

Figure 6A:
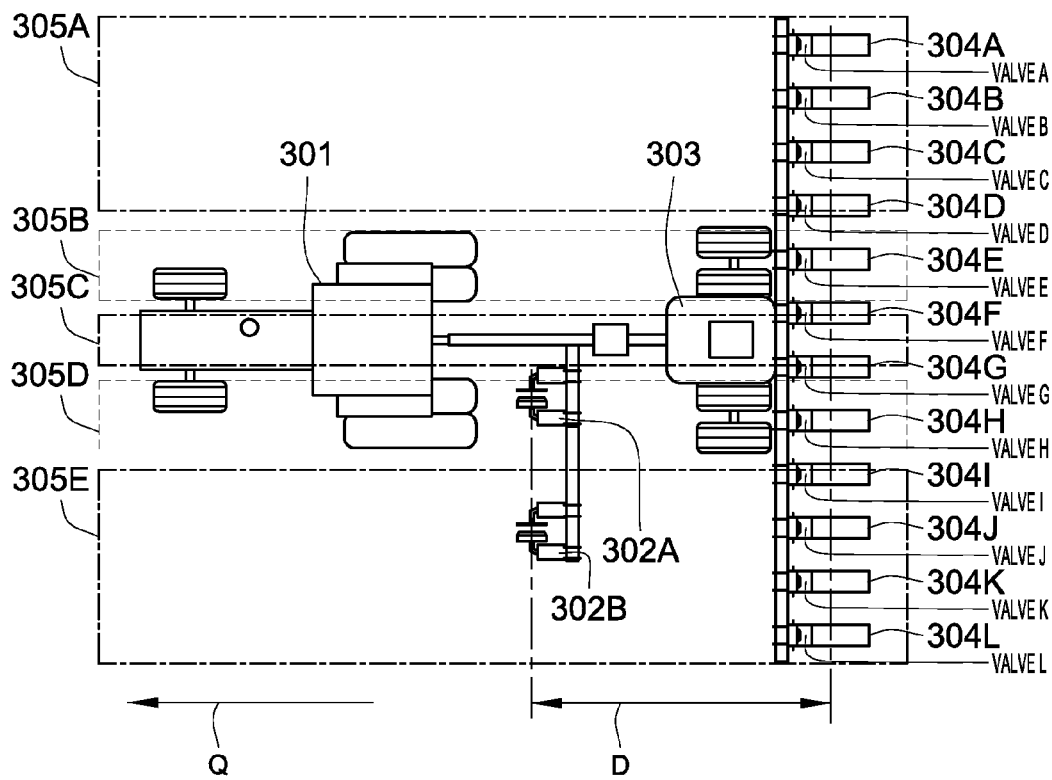
FIG. 6A is a top elevation illustrating an agricultural system in which a plurality of planting row units are adjusted by two soil-hardness sensing devices.
Figure 6B:
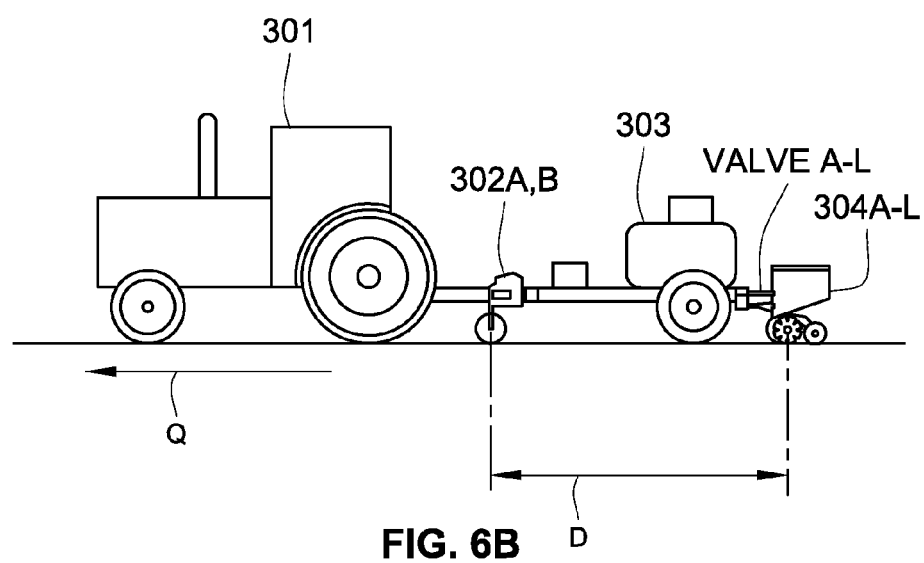
FIG. 6B is a side elevation illustrating the agricultural system of FIG. 6B.

Referring to FIGS. 6A and 6B, an agricultural system 300 includes a tractor 301, two soil-hardness sensing devices 302A, 302B, a planting device 303, and a plurality of planting row units 304A-304L, which are configured in a side-by-side arrangement. In this example, each of the planting row units 304A-304L has at least one respective control Valve A-L, which is adjustable based on signals received from the soil-hardness sensing devices 302A, 302B.

The tractor 301 moves at a speed Q, pulling the soil-hardness sensing device 302A, 302B, the planting device 303, and the planting row units 304A-304L along a soil area that includes five soil areas 305A-305E. Specifically, the soil areas 305A-305E includes a top outside area 305A, a top wheel area 305B, a central area 305C, a bottom wheel area 305D, and a bottom outside area 305E. The top wheel area 305B and the bottom wheel area 305D have soil conditions that are harder than the top outside area 305A, the central area 305C, and the bottom outside area 305E. The harder soil conditions are caused by the wheels of the tractor 301 and/or planting device 303, which form a compacted path as the tractor 301 moves along the soil area. Thus, each of the top wheel area 305B and the bottom wheel area 305D are areas compacted by the wheels of vehicles.

A first soil-hardness sensing device 302A controls only the planting row units 304E, 304H that are positioned inside the compacted paths of the top wheel area 305B and the bottom wheel area 305D. A second soil-hardness sensing device 302B controls all the other planting row units 304A-304D, 304F-304G, and 304I-304L, i.e., all the planting row units positioned outside the compact paths of the top wheel area 305B and the bottom wheel area 305D (and within the top outside area 305B, the central area 305C, and the bottom outside area 305E). Optionally, any number of soil-hardness sensing devices and any number of planting row units can be used. For example, each of the planting row units 304A-304L can have its own designated soil-hardness sensing device.

The soil-hardness sensing devices 302A, 302B are positioned at a distance D in front of the planting row units 304A-304L. Optionally, each of the soil-hardness sensing devices 302A, 302B can be positioned at a different distance in front of the planting row units 304A-304L. For example, the first soil-hardness sensing device 302A can be positioned at a distance X1 in front of the planting row units 304A-304L and the second soil-hardness sensing device 302B can be positioned at a distance X2 in front of the planting row units 304A-304L. As currently illustrated in FIGS. 6A-6B, the distances X1 and X2 are equal to each other (being effectively distance D). Furthermore, the first soil-hardness sensing device 302A is positioned inside the compacted path of the bottom wheel area 305D and the second soil-hardness sensing device 302B is positioned inside the bottom outside area 305E (i.e., outside the compacted path of the bottom wheel area 305D).

The soil-hardness sensing devices 302A, 302B and the attached planting row units 304A-304L are generally configured to sense soil conditions and adjust corresponding hydraulic pressures of Valves A-L as described above in reference to FIGS. 1-5. The configuration of having multiple soil-hardness sensing devices 302A, 302B increases precision in adjustment of hydraulic pressures, based on current soil conditions, because it accounts for differences between compacted and non-compacted paths in a field that is being planted. Thus, for example, the soil-hardness sensing devices 302A, 302B provides signals to corresponding control valves for increasing and/or decreasing hydraulic pressures of the planting row units 304A-304L.

The soil-hardness sensing devices discussed above can be remotely controlled. For example, the soil-hardness sensing devices 302A, 302B can be remotely controlled with a hand-held radio-frequency remote controller. By way of example, the remote controller can be used to manually increase and/or decrease the hydraulic pressures in one or more of the soil-hardness sensing devices 302A, 302B.

Figure 7:
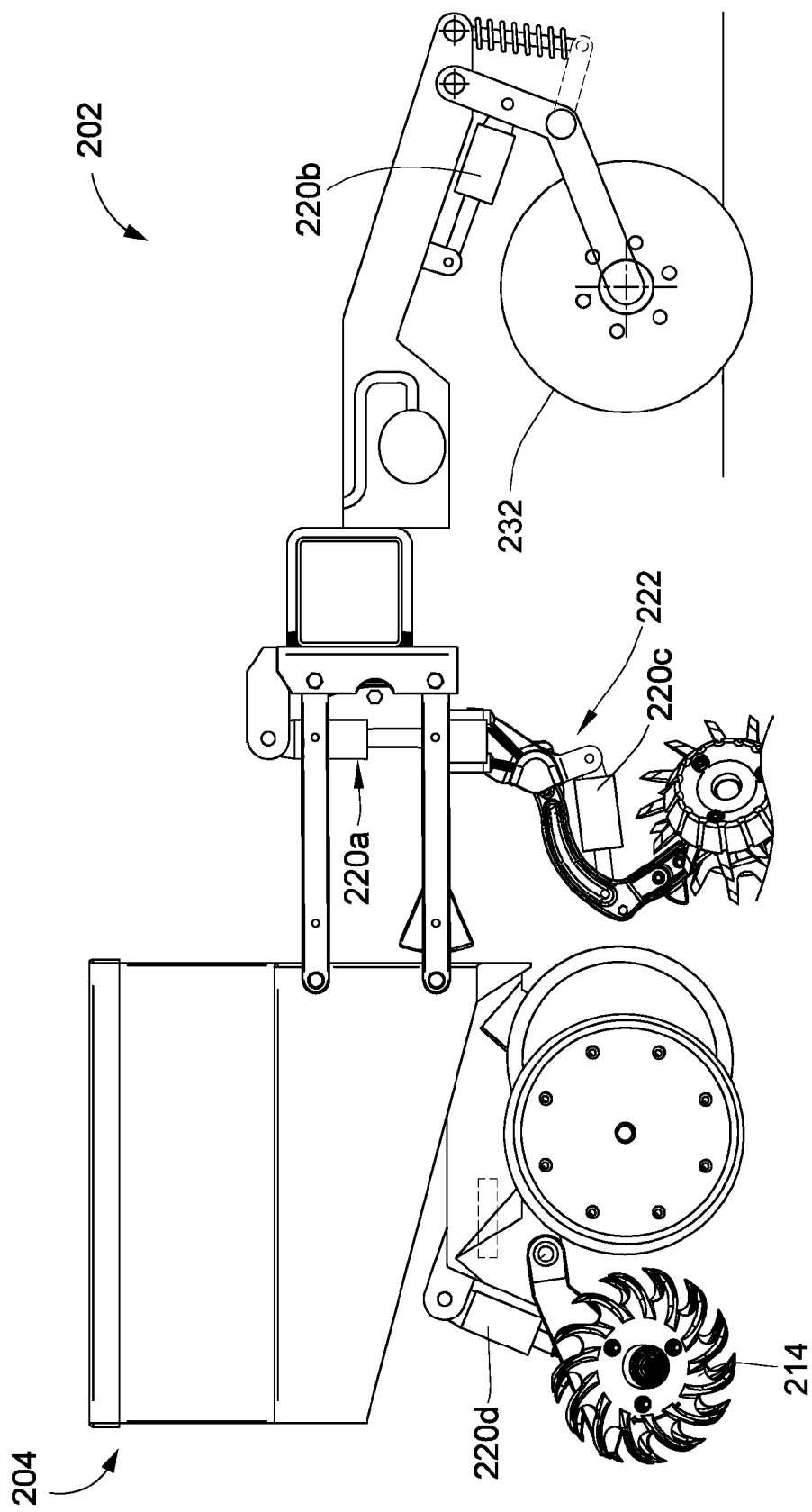
FIG. 7 is a side elevation illustrating an alternative embodiment of the soil-hardness sensing device with modular actuators.

Referring to FIG. 7, the soil-hardness device 202 illustrated in FIG. 5A has been modified to include modular actuators 220a-220d. Each of the modular actuators 220a-220d is identical (or nearly identical) to each other as a modular unit that allows the same unit to be used for movement of different components of the soil-hardness device 202. According to one example, the modular actuators 220a-220d include the hydraulic actuator 220 described above and illustrated in FIG. 5A or the hydraulic actuator 120 described above and illustrated in FIG. 1.

Each of the modular actuators 220a-220d provides controllable pressure for urging the respective components downwards and/or upwards, based on the mounting and type of actuator. For example, the modular actuators 220a-220d can include a double-acting actuator in which the controllable pressure can be applied to urge the planting row 104, alternately, both upwards and downwards.

A first one of the modular actuators 220a is configured and mounted to urge the planting row unit 204 with a controllable force. A second one of the modular actuators 220b is configured and mounted to urge the blade 232 with a controllable force. A third one of the modular actuators 220c is configured and mounted to urge the row-clearing unit 222 with a controllable force. A fourth one of the modular actuators 220d is configured and mounted to urge the closing wheel 214 with a controllable force. Thus, for each of the four independently movable components—the planting row unit 204, the blade 232, the row-clearing unit 222, and the closing wheel 214—the same modular actuator 220d is configured to achieve the desired force.

One exemplary benefit of having interchangeable actuators 220a-220d is that a reduced number of spare parts is required for maintaining the system, thus, reducing cost. Another exemplary benefit is that a farmer or operator does not have to learn how to use and/or replace a separate and distinct type of actuator for each movable component. For example, knowing how to replace or maintain the first actuator 220a means that the farmer knows how to replace or maintain each of the other three actuators 220b-220d. As such, the general result of having interchangeable actuators is reduced cost and a simpler system.

According to alternative embodiments, any number of modular actuators can be adapted for mounting in any agricultural systems. For example, the soil-hardness device 202 can include two modular actuators of a first type and two modular actuators of a second type. By way of a specific example, the first and second actuators 220a, 220b can include a double-acting actuator for applying both upwards and downwards pressure, and the third and fourth actuators 220c, 220d can include a single-acting actuator for applying either upwards or downwards pressure. In other embodiments, the modular actuators are used in systems that lack soil-hardness sensing capabilities.

Figure 8:
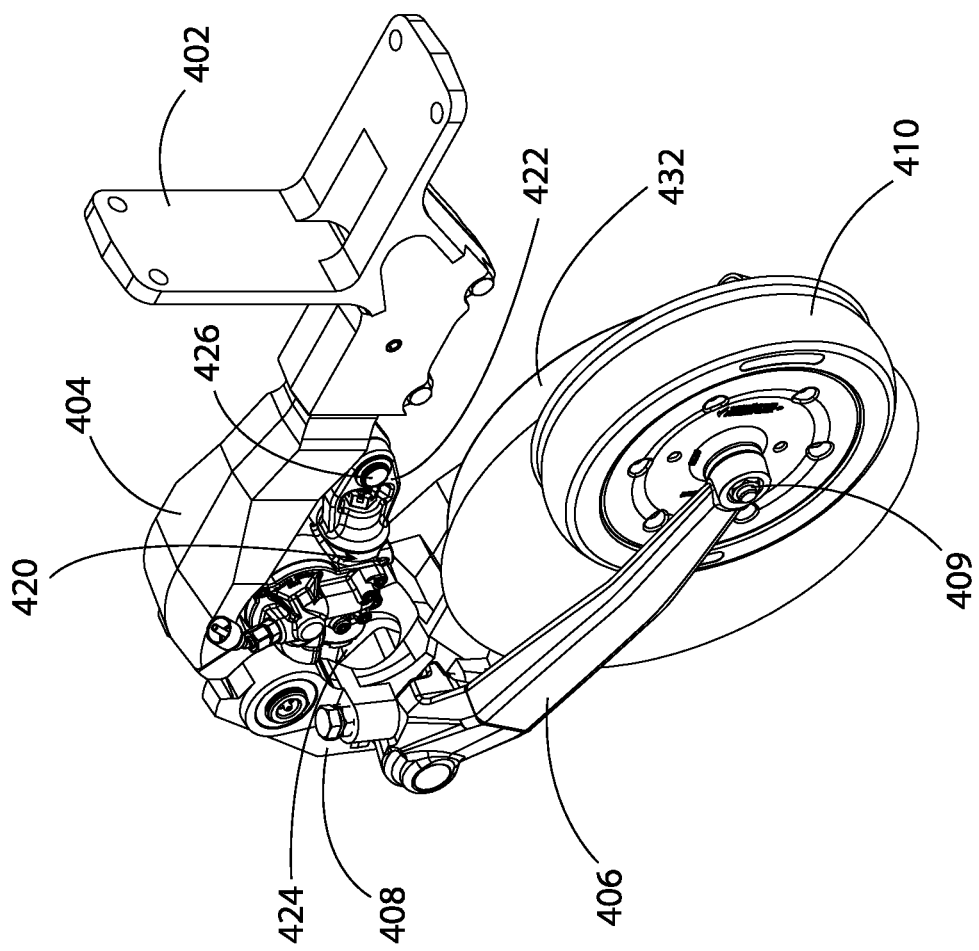
FIG. 8 is a perspective view illustrating an alternative modular unit.

Referring to FIG. 8, an alternative modular unit 400 includes a mounting bracket 402 attached to an upper support 404. A gauge arm 406 is pivotably attached at a proximal end 407 to a swing arm 408, which is attached to the upper support 404. The gauge arm 406 is attached at a distal end 409 to a gauge wheel 410, and the swing arm 408 is further attached to a blade 432.

The modular unit 400 includes a modular actuator 420 that is removably attached to the upper support 404 at a fixed end 422 and to the swing arm 408 at a movable piston end 424. The modular actuator 420 is illustrated in this exemplary embodiment as a pressure-applying device for the blade 432. However, to convert the modular actuator 420 for use in a different component (e.g., to apply pressure to the row-clearing unit 222), the modular actuator 420 is removed by removing, for example, an assembly bolt 426 and/or any other fastener holding the modular actuator 420 in place relative to the upper support 404 and the swing arm 408. Then, the same modular actuator 420 (without the requirement for additional components) can be fastened to a different component of the soil-hardness device 202 (e.g., the row-clearing unit 222). Thus, removal and/or assembly of the modular actuator 420 is easily achieved with minimal effort and a small number of fasteners.

Referring to FIGS. 9A and 9B, according to an alternate configuration, the blade arm 260 has a distal end 502 in which a ground-hardness sensor 500 is integrated. The ground-hardness sensor 500 is fixed relative to the blade arm 260 in a metallic cam 501 that includes an aperture 504 through which a rotating shaft 506 protrudes. The rotating shaft 506 is coupled to the gauge wheel 236 via the wheel arm 262. As the soil-hardness sensing device 202 travels over soil of varying conditions (e.g., from hard soil to soft soil), the gauge wheel 236 causes the shaft 506 to rotate. In turn, the ground-hardness sensor 500 detects the rotational movement of the shaft 506 within the aperture 504 and provides output indicative of an angular change between the gauge wheel 236 and the blade 232.

The ground-hardness sensor 500 also includes an indicator 508 that is configured to indicate a performance condition. For example, the indicator 508 is a light-emitting diode (LED) that displays a continuous green light when the ground-hardness sensor 500 is functioning properly and a flashing red light when a malfunction occurs.

The ground-hardness sensor 500 is shielded from the environment with a cover 510, which is mounted to the distal end 502 to enclose within the cam 501. The cover 510 consists of a translucent or transparent material, such as a clear plastic material, to readily allow visual inspection of the ground-hardness sensor 500. Thus, one benefit of the cover 510 is that an operator is not required to remove any parts to determine whether the ground-hardness sensor 500 is operating properly.

The ground-hardness sensor 500 is provided in addition to or instead of the encoder 266 described above in reference to FIG. 5A. As described above, as the shaft 506 rotates, the ground-hardness sensor 500 measures changes in the angle θ between the blade arm 260 and the wheel arm 262 to determine the depth Z of the blade 232 relative to the soil-hardness gauge wheel 236. Then, the angle θ is sent to the CPU 246 for executing the algorithm to determine corresponding pressure values for the planting row unit 204. The angle θ is directly proportional to the depth of the blade 232 relative to the soil-hardness gauge wheel 236.

The ground-hardness sensor 500 can be any analog or digital sensor that is capable of measuring an angular displacement. For example, the ground-hardness sensor 500 can be a linear inductive distance sensor, which is an analog device.

The blade arm 260 further includes a torsion spring 512 that engages the shaft 506 to rotationally bias the shaft 506 toward an equilibrium point when the shaft 506 applies a rotational force. The torsion spring 512 can be attached instead of or in addition to the spring 264 illustrated in FIG. 5A. According to the illustrated example, the torsion spring 512 is a compressive, rubber spring with adjustable down-pressure. Specifically, in this example, the torsion spring 512 is in the form of an external structure 512a in which an internal structure 512b is positioned. The external and internal structures 512a, 512b are generally rectangular and are concentrically aligned along a central axis. Furthermore, the internal structure 512b is offset at an angle of about 90 degrees relative to the external structure 512a. When the shaft 506 rotates in a first direction (e.g., counterclockwise), the internal structure 512b moves with the shaft 506 such that corners of the internal structure 512b tend to align with corners of the external structure 512a. Simultaneously, the external structure 512a applies a second, opposing force (e.g., clockwise) that counters the first direction and forces the internal structure 512b and the shaft 506 back towards the equilibrium point.

In addition to applying an opposing force to the rotational force of the shaft 506, the torsion spring 512 compresses to dampen the effects of the rotational force of the shaft 506. The compression provides a smoother change in movement for the blade arm 260, and increases the torsion spring 512 resistance to fatigue.

Another benefit of integrating the torsion spring 512 in the blade arm 260 is that the torsion spring is protected from environmental conditions, including dirt or mud, that can potentially interfere with the applied compressive force. Yet another benefit of the torsion spring 512 is that it reduces the number of exposed components, which can be a hazard to human operators.

It will be evident to those skilled in the art that the invention is not limited to the details of the foregoing illustrated embodiment and that the present invention may be embodied in other specific forms without departing from the spirit or essential attributes thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A planting row unit attachable to a towing frame, the planting row unit being movable in a forward direction on a field having soil of varying hardness conditions, the planting row unit including an opener device forward of the towing frame for preparing the soil for receiving at least one of the fertilizer and the seeds, the opener device including
   a soil-hardness sensor for detecting changes in soil-hardness conditions;
   an opener blade for maintaining, in response to the changes, a constant soil-penetration depth Z in the soil independent of the varying hardness conditions; and
   a modular actuator mounted to the opener device for applying pressure to the opener blade, the modular actuator being mountable to at least one other component of the planting row unit for applying pressure.

2. The planting row unit of claim 1, wherein the at least one other component is a device selected from a group consisting of a row-clearing unit and a closing wheel.

3. The planting row unit of claim 1, wherein the planting row unit further includes a parallel linkage coupled to the towing frame via a front frame, the modular actuator being mountable to the parallel linkage for applying pressure to the planting row unit.

4. The planting row unit of claim 1, wherein the modular actuator is a double-acting actuator in which controllable pressure is applied, alternately, upwards and downwards.

5. The planting row unit of claim 1, further comprising an upper support attached to a mounting bracket, the mounting bracket being rigidly attachable directly to the towing frame, the modular actuator having a fixed end removably attached to the upper support via a fastener.

6. The planting row unit of claim 5, further comprising a swing arm coupled to the upper support at an upper end and to the opener blade at a lower end, the modular actuator having a movable end removably attached to the upper end of the swing arm.

7. The planting row unit of claim 1, wherein the soil-hardness sensor is selected from a group consisting of an analog sensor and a digital sensor.

8. The planting row unit of claim 1, further comprising a blade arm having a distal end in which the soil-hardness sensor is integratedly mounted, the blade arm being coupled to the blade opener at a proximal end, the soil-hardness sensor having an indicator for indicating a performance condition of the soil-hardness sensor.

9. The planting row unit of claim 8, wherein the soil-hardness sensor is shielded with a cover having material selected from a group consisting of a transparent material and a translucent material.

10. The planting row unit of claim 8, further comprising a torsion spring integratedly mounted in the distal end of the blade arm, the torsion spring consisting of a compressive material.

11. An agricultural system comprising:
    a towing frame; and
    a plurality of planting row units attached to the towing frame in a side-by-side arrangement, the plurality of planting row units being movable in a forward direction on a field having soil of varying hardness conditions, the soil including a soft soil and a hard soil, at least one of the plurality of planting row units including an opener device forward of the towing frame for preparing the soil for receiving at least one of the fertilizer and the seeds, the opener device including
      a soil-hardness sensor for detecting changes in soil-hardness conditions,
      an opener blade for maintaining, in response to the changes, a constant soil-penetration depth Z in the soil independent of the varying hardness conditions, and
      a modular actuator mounted to the opener device for applying pressure to the opener blade, the modular actuator being mountable to at least one other component of the planting row unit for applying pressure.

12. The agricultural system of claim 11, wherein the at least one other component is a device selected from a group consisting of a row-clearing unit and a closing wheel.

13. The agricultural system of claim 11, wherein the at least one planting row unit further includes a parallel linkage coupled to the towing frame via a front frame, the modular actuator being mountable to the parallel linkage for applying pressure to the at least one planting row unit.

14. The agricultural system of claim 11, wherein the modular actuator is a double-acting actuator in which controllable pressure is applied, alternately, upwards and downwards.

15. The agricultural system of claim 11, wherein the at least one planting row unit further includes an upper support attached to a mounting bracket, the mounting bracket being rigidly attached directly to the towing frame, the modular actuator having a fixed end removably attached to the upper support via a fastener.

16. The agricultural system of claim 15, further comprising a swing arm coupled to the upper support at an upper end and to the opener blade at a lower end, the modular actuator having a movable end removably attached to the upper end of the swing arm.

17. The agricultural system of claim 11, wherein the soil-hardness sensor is selected from a group consisting of an analog sensor and a digital sensor.

18. The agricultural system of claim 11, wherein the at least one planting row unit further includes a blade arm having a distal end in which the soil-hardness sensor is integratedly mounted, the blade arm being coupled to the blade opener at a proximal end, the soil-hardness sensor having an indicator for indicating a performance condition of the soil-hardness sensor.

19. The agricultural system of claim 18, wherein the soil-hardness sensor is shielded with a cover having material selected from a group consisting of a transparent material and a translucent material.

20. The agricultural system of claim 18, further comprising a torsion spring integratedly mounted in the distal end of the blade arm, the torsion spring having a rectangular shape and consisting of a compressive material.

\* \* \* \* \*